US010409646B2

(12) United States Patent
Liu et al.

(10) Patent No.: US 10,409,646 B2
(45) Date of Patent: *Sep. 10, 2019

(54) MODULAR ELECTRONIC DEVICES WITH CONTEXTUAL TASK MANAGEMENT AND PERFORMANCE

(71) Applicant: Google LLC, Mountain View, CA (US)

(72) Inventors: Eric H C Liu, Redwood City, CA (US); Kevin D. Brune, Maple Valley, WA (US); Yoshimichi Matsuoka, Sunnyvale, CA (US); Gilbert Cabillic, Brece (FR); Gaurav Shah, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,760

(22) Filed: Jun. 29, 2018

(65) Prior Publication Data

US 2018/0321982 A1    Nov. 8, 2018

Related U.S. Application Data

(63) Continuation of application No. 15/130,242, filed on Apr. 15, 2016, now Pat. No. 10,025,636.

(51) Int. Cl.
*G06F 9/50*    (2006.01)
*G06Q 30/00*    (2012.01)

(52) U.S. Cl.
CPC .......... *G06F 9/5038* (2013.01); *G06F 9/5027* (2013.01); *G06F 9/5083* (2013.01); *G06Q 30/00* (2013.01); *G06F 2209/503* (2013.01); *G06F 2209/5019* (2013.01); *G06F 2209/548* (2013.01)

(58) Field of Classification Search
CPC ..................................... G06F 9/5038
See application file for complete search history.

(56) References Cited

U.S. PATENT DOCUMENTS

| | | | |
|---|---|---|---|
| 5,809,325 | A | 9/1998 | Hinton et al. |
| 6,069,911 | A | 5/2000 | Sealander et al. |
| 6,282,561 | B1 | 8/2001 | Jones et al. |
| 6,771,595 | B1 | 8/2004 | Gilbert et al. |
| 6,785,889 | B1 | 8/2004 | Williams |
| 6,941,399 | B2 | 9/2005 | Loh |
| 6,961,575 | B2 | 11/2005 | Stanforth |
| 6,968,323 | B1 | 11/2005 | Bansal et al. |
| 6,975,613 | B1 | 12/2005 | Johansson |
| 7,009,939 | B2 | 3/2006 | Baker et al. |
| 7,043,225 | B1 | 5/2006 | Patel et al. |

(Continued)

FOREIGN PATENT DOCUMENTS

| | | |
|---|---|---|
| EP | 2073464 | 6/2009 |
| EP | 2749200 | 7/2014 |

OTHER PUBLICATIONS

Haojun et al. "Task Scheduling Prediction Algorithms for Dynamic Hardware/Software Partitioning", 2012 Fifth International Symposium on Parallel Architectures, Algorithms, and Programming, Dec. 17, 2012, pp. 80-85.

(Continued)

*Primary Examiner* — Sisley N Kim
(74) *Attorney, Agent, or Firm* — Dority & Manning, P.A.

(57) ABSTRACT

The present disclosure provides modular electronic devices that are capable of managing task performance based on a particular context of computing resources currently available from the ad hoc combination of devices.

17 Claims, 10 Drawing Sheets

(56) References Cited

U.S. PATENT DOCUMENTS

| | | |
|---|---|---|
| 7,058,387 B2 | 6/2006 | Kumar et al. |
| 7,184,759 B2 | 2/2007 | Date et al. |
| 7,257,632 B2 | 8/2007 | Zhang et al. |
| 7,340,759 B1 | 3/2008 | Rodriguez |
| 7,346,354 B2 | 3/2008 | Patel |
| 7,463,890 B2 | 12/2008 | Herz et al. |
| 7,489,656 B2 | 2/2009 | Guo et al. |
| 7,689,681 B1 | 3/2010 | David |
| 7,720,968 B2 | 5/2010 | Clark, Jr. et al. |
| 7,788,133 B2 | 8/2010 | Delenda |
| 8,027,684 B2 | 9/2011 | Gupta et al. |
| 8,028,057 B2 | 9/2011 | David |
| 8,156,500 B2 | 4/2012 | Helander |
| 8,185,909 B2 | 5/2012 | Sigal et al. |
| 8,249,984 B2 | 8/2012 | Dawson et al. |
| 8,276,143 B2 | 9/2012 | Vengerov et al. |
| 8,296,770 B2 | 10/2012 | Ohno |
| 8,320,414 B2 | 11/2012 | Dawson et al. |
| 8,355,670 B2 | 1/2013 | White |
| 8,424,007 B1 | 4/2013 | Hernacki et al. |
| 8,520,535 B2 | 8/2013 | Dawson et al. |
| 8,667,065 B1 | 3/2014 | Odom |
| 8,694,968 B2 | 4/2014 | Eteminan et al. |
| 8,730,994 B2 | 5/2014 | Kannan et al. |
| 8,782,211 B1 | 7/2014 | Sharma |
| 8,843,933 B1 | 9/2014 | Holler et al. |
| 9,003,039 B2 | 4/2015 | Amorim |
| 9,015,708 B2 | 4/2015 | Choudhury et al. |
| 9,031,531 B2 | 5/2015 | Miluzzo et al. |
| 9,037,508 B2 | 5/2015 | Dawson et al. |
| 9,038,195 B2 | 5/2015 | Satpathy et al. |
| 9,075,659 B2 | 7/2015 | Barzel et al. |
| 9,078,274 B2 | 7/2015 | Guo |
| 9,083,819 B2 | 7/2015 | Chan et al. |
| 9,118,750 B2 | 8/2015 | Vossoughi et al. |
| 9,148,473 B1 | 9/2015 | Sharma |
| 9,229,781 B2 | 1/2016 | Karaoguz et al. |
| 9,241,304 B2 | 1/2016 | Dawson et al. |
| 2002/0058499 A1 | 5/2002 | Ortiz |
| 2003/0139199 A1 | 7/2003 | Kinnula et al. |
| 2003/0217129 A1 | 11/2003 | Knittel et al. |
| 2004/0111308 A1 | 6/2004 | Yakov |
| 2004/0128262 A1 | 7/2004 | Nafousi |
| 2004/0156312 A1 | 8/2004 | Salonidis et al. |
| 2004/0165548 A1 | 8/2004 | Backes |
| 2004/0203820 A1 | 10/2004 | Billhartz |
| 2006/0007955 A1 | 1/2006 | Kotzin |
| 2006/0167784 A1 | 7/2006 | Hoffberg |
| 2006/0168571 A1 | 7/2006 | Ghiasi et al. |
| 2007/0179829 A1 | 8/2007 | Laperi et al. |
| 2007/0230421 A1 | 10/2007 | Roadknight |
| 2007/0294692 A1 | 12/2007 | Zhao et al. |
| 2008/0040481 A1 | 2/2008 | Joshi et al. |
| 2008/0298284 A1 | 12/2008 | Dawson et al. |
| 2008/0298314 A1 | 12/2008 | Dawson et al. |
| 2008/0300890 A1 | 12/2008 | Dawson et al. |
| 2008/0301017 A1 | 12/2008 | Dawson et al. |
| 2008/0313642 A1 | 12/2008 | Karaoguz et al. |
| 2009/0025004 A1 | 1/2009 | Barnard et al. |
| 2009/0106730 A1 | 4/2009 | Mockford |
| 2009/0180430 A1 | 7/2009 | Fadell |
| 2009/0228888 A1 | 9/2009 | Vengerov et al. |
| 2009/0271324 A1 | 10/2009 | Jandhyala et al. |
| 2010/0223385 A1 | 9/2010 | Gulley et al. |
| 2010/0251259 A1 | 9/2010 | Howard |
| 2010/0332262 A1 | 12/2010 | Horvitz et al. |
| 2011/0288905 A1 | 11/2011 | Mrakas |
| 2011/0320233 A1 | 12/2011 | Arnette et al. |
| 2012/0079097 A1 | 3/2012 | Gopisetty et al. |
| 2012/0198462 A1 | 8/2012 | Cham et al. |
| 2012/0324111 A1 | 12/2012 | Barzel et al. |
| 2013/0042004 A1 | 2/2013 | Boss et al. |
| 2013/0346993 A1 | 12/2013 | Chen et al. |
| 2014/0067496 A1 | 3/2014 | Buswell |
| 2014/0195683 A1 | 7/2014 | Ammerman, III et al. |
| 2014/0307635 A1 | 10/2014 | Agrawal et al. |
| 2015/0026336 A1 | 1/2015 | Suchter et al. |
| 2015/0067022 A1 | 3/2015 | Subbiah |
| 2015/0074635 A1 | 3/2015 | Margiotta et al. |
| 2015/0081877 A1 | 3/2015 | Sethi et al. |
| 2015/0195011 A1 | 7/2015 | Birgel et al. |
| 2015/0206228 A1 | 7/2015 | Perez et al. |
| 2016/0266930 A1 | 9/2016 | Jones et al. |
| 2016/0299787 A1 | 10/2016 | Hayakawa et al. |
| 2017/0078442 A1 | 3/2017 | Pacella et al. |

OTHER PUBLICATIONS

International Search Report and Written Opinion for PCT/US2016/062671, dated Apr. 4, 2017, 16 pages.

Partial International Search for PCT/US2016/062671, dated Feb. 6, 2017, 1 page.

MODULAR ELECTRONIC DEVICES WITH CONTEXTUAL TASK MANAGEMENT AND PERFORMANCE

PRIORITY CLAIM

The present application is a continuation of U.S. application Ser. No. 15/130,242 having a filing date of Apr. 15, 2016. Applicant claims priority to and the benefit of U.S. application Ser. No. 15/130,242 and incorporates U.S. application Ser. No. 15/130,242 herein by reference in its entirety.

FIELD

The present disclosure relates generally to modular electronic devices and ad hoc combinations of modules and other electronic devices. More particularly, the present disclosure relates to modular electronic devices that are capable of managing task performance based on a particular context of computing resources currently available from the ad hoc combination of devices.

BACKGROUND

Modular systems such as a modular electronic device can have multiple different modular electronic components, which can be referred to as "modules." Modules can be removable, replaceable, and/or interchangeable. In general, different modules of a modular device or system can be capable of performing different functions, including a specialized function and/or one or more general functions.

As an example, specialized modules can perform one or more specific functions using one or more specific resources. Examples of specialized modules include a camera module, a battery module, or other module configured to perform a particular task. Thus, in some examples, the specific functions can include capturing an image, supplying power, or performing a specific function using special hardware (e.g., performing a cryptographic function, a graphics processing function, etc.).

Other modules can have the capability to perform general functions using their general resources, such as a memory and a processor. For example, modules can have the ability to communicate with an external module or device (e.g., through a hardwired connection or using a wireless connection). Examples of general functions include performing a processing task, storing data in memory, or utilizing communication bandwidth.

Modules can be combined with other modules or devices. In some examples, such combination can utilize physical combination, for example, by attaching modules to each other or a common structure. For example, a processing module from a modular phone can be removably physically combined with an interface module (e.g., HDMI or USB) to provide video-playback functionality. In other examples, combinations of modules can include physically unconnected devices, such as, for example, modules that are communicatively connected over one or more wireless communication links.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for contextual task management. The method includes identifying, by a modular electronic device comprising at least a first electronic module, a plurality of computing tasks to be performed. The method includes determining, by the modular electronic device, a plurality of required sets of computing resources respectively required to perform the plurality of computing tasks. The method includes determining, by the modular electronic device, a current set of computing resources that are currently available to the modular electronic device via an ad hoc combination of devices. The method includes comparing, by the modular electronic device, the current set of computing resources to the plurality of required sets of computing resources. The method includes identifying, by the modular electronic device, at least one computing task that is currently performable based on the comparison of the current set of computing resources to the plurality of required sets of computing resources. The method includes causing, by the modular electronic device, performance of the at least one performable computing task by the ad hoc combination of devices.

Another example aspect of the present disclosure is directed to a modular electronic device. The modular electronic device includes at least one processor and at least one electronic module. The modular electronic device identifies a plurality of computing tasks to be performed and determines a plurality of required sets of computing resources respectively required to perform the plurality of computing tasks. The modular electronic device senses a current set of computing resources that are currently available to the modular electronic device via an ad hoc combination of devices and compares the current set of computing resources to the plurality of required sets of computing resources. The modular electronic device identifies at least one computing task that is currently performable based on the comparison of the current set of computing resources to the plurality of required sets of computing resources and causes performance of the at least one performable computing task by the ad hoc combination of devices.

Another example aspect of the present disclosure is directed to at least one non-transitory computer-readable medium that stores instructions that, when executed by at least one processor, cause the at least one processor to identify one or more computing tasks to be performed. Execution of the instructions causes the at least one processor to determine a current set of computing resources that are currently available to the electronic device via an ad hoc device combination that includes at least one of an electronic module physically coupled to the electronic device and an additional computing device that is communicatively coupled to the electronic device but not physically coupled to the electronic device. Execution of the instructions causes the at least one processor to select at least one of the computing tasks based at least in part on the current set of computing resources. Execution of the instructions causes the at least one processor to cause performance of the at least one computing task at least in part by the at least one of the electronic module and the additional computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
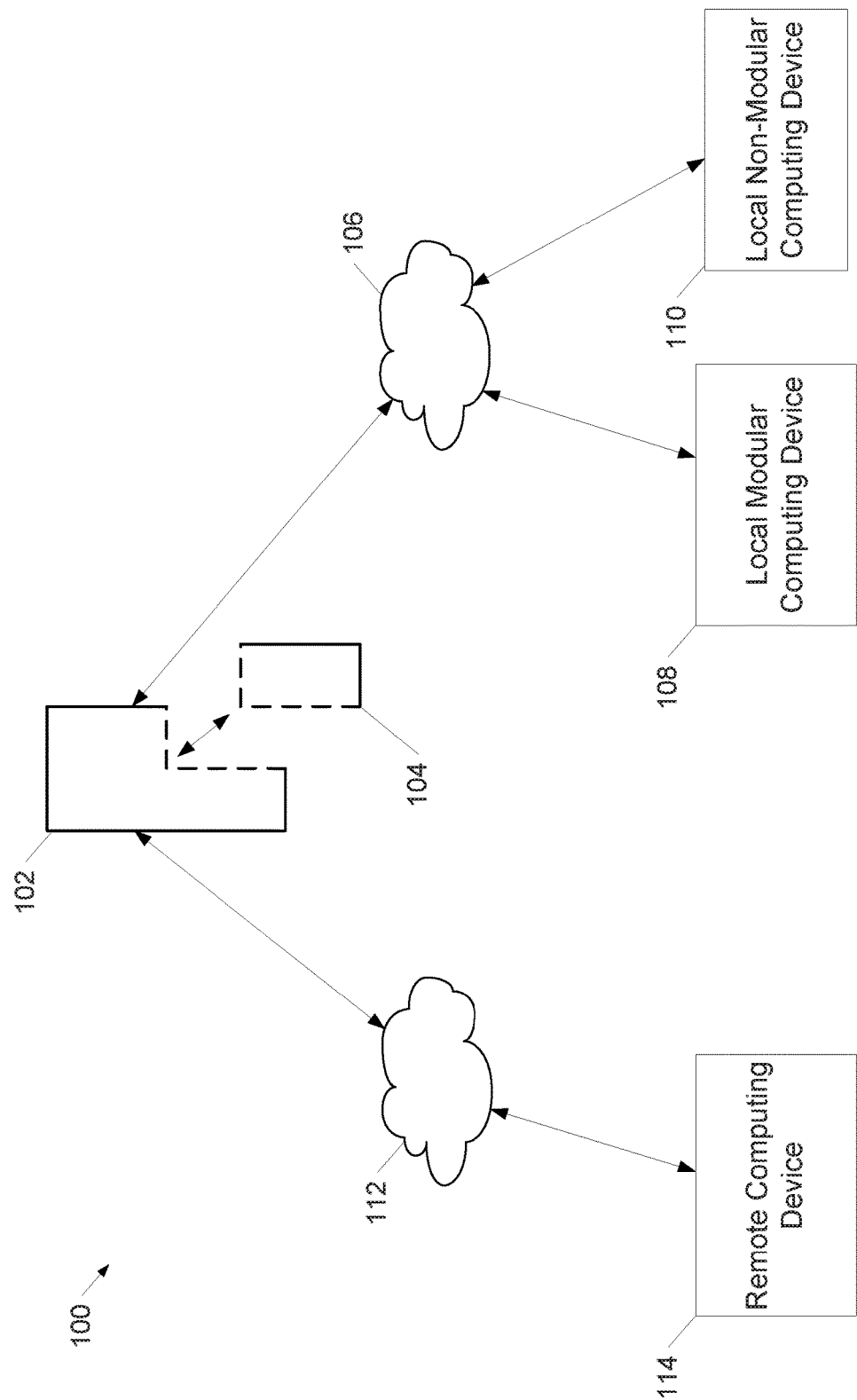
FIG. 1 depicts a block diagram of an example ad hoc combination of modules and devices according to example embodiments of the present disclosure.

Generally, the present disclosure is directed to modular electronic devices and associated methods of operation. In particular, the present disclosure relates to ad hoc combinations of modules and other devices that can sense each other, connect, and share functionality. Modules can discover each other's presence and availability and can advertise their own availability, capabilities, and price. Modules can negotiate use of other modules' resources, identify tasks suitable for a current module network environment, and/or assign tasks using resources of different modules to complete the tasks.

More particularly, the present disclosure is directed to a modular electronic device and electronic modules thereof that are capable of performing task management based on a particular context of computing resources that are currently available to the modular electronic device. For example, the computing resources can be available to the device from various participants of an ad hoc combination of modules and/or other devices.

In particular, the modular electronic device can select one or more tasks to perform based on the sensed context of currently available resources. For example, the modular electronic device can monitor currently available resources and capabilities and can compare such currently available resources to required resources associated with various tasks and/or queues of tasks. Based on such comparison, the modular electronic device can identify one or more tasks that are currently performable by the ad hoc combination of devices and can cause performance of one or more of the performable tasks. For example, the one or more tasks can be performed at least in part by one or more of the modules/devices included in the ad hoc combination of modules/devices. Thus, the systems and methods of the present disclosure can consistently optimize task performance based on available resources.

More particularly, a modular electronic device can have certain computing tasks that it may need to perform. For example, the tasks can be predefined tasks, user-requested tasks, tasks that have been predicted to be desired in the future, background tasks, autonomous tasks, or other types of computing tasks. Example computing tasks can include a processing task (e.g., an encryption task), a communication task (e.g., a communications passthrough), a storage task (e.g., a specialized secure storage task), a data collection task (e.g., operation of a sensor such as a temperature sensor, biometric sensor, etc.), or other tasks, operations, or actions to be performed by a module or device.

Generally, each task to be performed by the device can have a corresponding set of resources that are required to perform such tasks. As one example, a computing task might be a graphics processing task. Performance of the graphics processing tasks may require that a particular hardware resource be available, such as, for example, a specialized graphics processing unit. Other tasks may require only general hardware such as a storage task which requires only some form of non-transitory computer-readable storage. Some tasks can have multiple different sets of resources that are capable of performing the task, but certain sets may have improved performance (e.g., faster) or may have more efficient performance (e.g., cheaper). Thus, the modular electronic device can continuously and/or periodically monitor available resources to identify computing tasks that are able to be performed.

When the resources required for performance of one or more tasks become available (e.g., as other modules or other devices enter the ad hoc combination of modules/devices), the modular electronic device can identify that the one or more tasks are capable of being performed by the currently available resources. The modular electronic device can negotiate with one or more modules/devices to obtain use of the required resources so that the one or more tasks can be performed.

In some implementations, the modular electronic device can perform the above described process automatically. As an example, a module of the device can continuously monitor resource availability and autonomously manage task performance according to a set of guidelines. For example, a module of the device and/or other connected modules can determine appropriate tasks to perform for the available capabilities based on predefined goals or preferences specified by a user, default operations, or other settings or guidelines.

In other implementations, the modular electronic device can recognize that one or more tasks are capable of being performed and can notify a user of the device regarding such capability. The user can select one of the performable tasks and the modular electronic device can cause the task to be performed (e.g., by negotiating use of the required resources). Thus, the device can notify the user of the availability of resources and permit the user to choose a particular task to perform.

In some implementations, the modular electronic device can suggest or predict one or more tasks that the user may wish to be performed with detected available resources of other modules and devices. As an example, the modular electronic device can predict one or more tasks expected to be requested in the future by analyzing past task data to identify one or more patterns of task requests. Different sets of resources can be associated with the different patterns of task requests. In response to detecting that a particular set of resources are available, a module can suggest (e.g., cause display of) a list of tasks that make use of such particular set of resources. The user can be enabled to select one or more of the listed tasks for performance.

According to an aspect of the present disclosure, the modular electronic device can assign a global priority to each of the computing tasks. The global priority for each task can generally describe an importance of having the task performed relative to all other tasks. For example, a task that is required to be performed within the next hour may have a superior or more significant global priority relative to a background cleanup task that does not have a deadline. The global priority can be assigned according to any prioritization scheme (e.g., scoring, ranking, banded, hierarchical, etc.). In some implementations, one or more global priorities can be assigned by the user to one or more tasks (e.g., via interaction with a user interface).

In some implementations, the modular electronic device can use the global priority to assist in selecting the particular task for performance. As one example, if the available resources are sufficient to perform only one of several tasks, the modular electronic device can select the task with the most significant priority for performance. As another example, the global priority can be one factor of several considered by the modular electronic device when selecting tasks for performance.

According to another aspect of the present disclosure, in some implementations, the modular electronic device can place tasks within one or more queues. In particular, the modular electronic device (e.g., one of the device's modules) can create and manage task queues which are associated with certain set(s) of devices/functionalities. In some implementations, tasks which share some or all of the same required set of resources can be placed within a shared queue. Alternatively or in addition to resource requirements, various other factors or variables can be used to assign a task to a particular queue. In some implementations, a single task can be assigned to multiple queues. In some implementations, respective portions of a task (e.g., "tasklets") can be assigned into different respective queues. Thus, tasks can be grouped into queues tasks based on resource requirements and/or other factors.

According to another aspect of the present disclosure, in some implementations, the modular electronic device can maintain sub-queues of tasks within a particular queue. For example, sub-queues within a queue can be formed and maintained based on priority levels, resource requirements, task status, module correspondence (e.g., which module or application requested the task), project correspondence (e.g., which greater project is this task in furtherance of), or other task variables. Further, respective tasklets derived from a particular task can be assigned to different sub-queues based on priority, resource requirements, etc.

According to another aspect, in some implementations, alternatively or in addition to sub-queues, the modular electronic device can assign an intra-queue priority to each task within each queue. The intra-queue priority for each task generally describes the importance of such task relative to other tasks included within the same queue. In some implementations, the intra-queue priority for each task can be based on or otherwise reflective of the global priority assigned to such task. The intra-queue priority can be assigned according to any prioritization scheme (e.g., scoring, ranking, banded, hierarchical, etc.). In some implementations, one or more intra-queue priorities can be assigned by the user (e.g., via interaction with a user interface).

According to yet another aspect of the present disclosure, in some implementations, an inter-queue priority can be assigned to each of the queues of computing tasks. Thereafter, one or more particular queues of tasks can be selected for performance based on their respective inter-queue priorities. For example, a first queue that includes one or more performable tasks can be selected for performance in favor of a second queue if the first queue has a superior inter-queue priority.

In some implementations, the inter-queue priority for a particular queue can be based on the global priorities associated with the tasks included within such queue. As one example, the inter-queue priority for a particular queue can be equal to or otherwise based on a cumulative or aggregate priority associated with all of the tasks included within such queue. As another example, the inter-queue priority for a particular queue can equal or otherwise be based on the most significant global priority assigned to one of the tasks included within such queue. In other implementations, the inter-queue priority is independent from or otherwise uninfluenced by the global priorities associated with tasks included within such queue.

Thus, the present disclosure provides electronic modules or modular electronic devices that are capable of selecting tasks to perform or otherwise managing task performance based on a particular context of computing resources currently available from the ad hoc combination of modules and modular electronic devices. In particular, the modular devices of the present disclosure can detect available resources and, based on the available resources, automatically identify and perform tasks that utilize the resources. In one example, a modular electronic device may not have high-speed Internet communication capability. When such device detects availability of a high-speed Internet connection through a newly inserted module, it can automatically schedule one or more synchronization or backup tasks to be performed using the module.

Furthermore, example techniques or operations described herein as being performed by a modular electronic device can additionally and/or alternatively be performed by a server computing device in communication with the modular electronic device. For example, in some implementations, a server computing device can perform task management based on a particular context of computing resources available to a particular modular electronic device and then communicate task management commands to the particular modular electronic device. In addition, although the example techniques or operations described herein are discussed with reference to a modular electronic device, such techniques and operations are equally applicable to standard, non-modular computing devices. For example, in some implementations, a non-modular computing device (e.g., laptop or traditional smartphone) can perform task management based on a particular context of computing resources that are currently available to the non-modular electronic device.

With reference now to the Figures, example embodiments of the present disclosure will be discussed in further detail.

Example Devices and Systems

FIG. 1 depicts a block diagram of an example system 100 that includes a modular electronic device 102 participating in an ad hoc combination of devices on a wireless network 106 according to example embodiments of the present disclosure. The example modular electronic device 102 includes one or more electronic modules that can be removably coupled to the modular electronic device 102. Each module of the modular electronic device 100 can include and provide a particular set of capabilities based on its own respective on-board components, including processing, memory storage, etc. A single representative example electronic module 104 is illustrated in FIG. 1 for the purposes of explanation. However, the modular electronic device 102 can have any number of electronic modules. In particular, the number of electronic modules included in the modular electronic device 102 can change over time as modules are swapped in and out of the device 102.

According to aspects of the present disclosure, the modular electronic device 100 is capable of participating (e.g., by way of the module 104) in ad hoc combinations of modules and other devices that can sense each other, connect, and share functionality. For example, the ad hoc combination of modules can include a plurality of modules that are each physically coupled to the device 102. Alternatively or additionally to the physically coupled modules, the combination of modules and other devices can include one or more additional devices (e.g., devices 108 and 110) that are communicatively coupled to the modular electronic device 102 over one or more wireless networks 106. The additional devices accessible over the network can include other modular devices (e.g., device 108) and/or non-modular devices (e.g., device 110). Non-modular device 110 can include a smartphone, a tablet computer, a laptop computer, a desktop computer, a smart appliance, an embedded computing device, or other computing devices. Devices can be user-controlled, autonomous, or some combination thereof.

The wireless network 106 can be one network (e.g., a Wi-Fi network) or a combination of networks (e.g., a combination of a local area Wi-Fi network, a device-specific personal area network, a piconet, a module-to-module mesh network, etc.). In particular, modules can be capable of communicating with other modules using a wireless communication interface such as RF communication, Near-Field Communication, Bluetooth, Wi-Fi, other wireless communication protocols, or some combination thereof. Thus, modules can be combined logically to perform tasks without a physical connection between the modules. The modular electronic device 100 can be further capable of communicating with one or more physically remote devices 114 (e.g., a server computing device) over a wide area network 112 (e.g., the Internet).

Additional computing devices can enter and depart the ad hoc combination over time. Further, different modules can be owned by different entities in an environment. For example, modules can be part of multiple devices that belong to the same user or to different users. As an example, in a conference room, the video-conference system can offer its modules to users within the room.

In one particular example, a user of the modular electronic device 102 can visit a coffee shop. Additional devices (e.g., devices 108 and 110) can also be located in the coffee shop. For example, the additional devices can include other customers' smartphones, other customers' laptops, a transaction processing device (e.g., "cash register"), or any other computing devices located within the coffee shop or otherwise within range to engage in communications. Thus, as customers enter and leave the coffee shop, their respective devices can join and depart the ad hoc combination of devices available over the network 106. Likewise, as the user of the modular electronic device 102 leaves the coffee shop and visits other locations (e.g., a transit station), the modular electronic device 102 can be exposed to many different ad hoc combinations of devices that are respectively located at such other locations (e.g., the transit station).

According to aspects of the present disclosure, each module of the device 100 can provide or enable different functionality based on its connection in different device environments. Similarly, if other modular electronic devices (e.g., modular device 108) are communicatively connected over a network, the modules of such devices can each provide or enable their own respective functionalities. Likewise, non-modular devices can provide or enable different functionalities as well.

As an example, the module 104 of the modular device 102 can perform particular tasks when connected to the device 102. For example, the example module 104 can provide processing functionality, memory storage functionality, or other specific functions based on its particular hardware and/or software.

Further, each module can be removed from the modular device 102 and connected in a different environment to perform different tasks. For example, the module 104 can perform particular tasks if it is connected to a different device, or it can be a module in a connected network of modules that can create an ad hoc higher level functionality.

The tasks to be performed by a module or network of modules can be defined in various ways. In some instances, a user can indicate particular tasks. For example, a user can specify particular tasks to perform using available capabilities of the module and other connected modules/devices. In some cases, the module 104 or modular device 102 can output (e.g., display) to the user the capabilities it and other connected modules have available.

In one example, the module 104 of the modular device 102 can be a cellular communication module. The cellular communication module can offer to provide cellular communication capability to a different device (e.g., device 110) that can lack such capability. In another example, if the modular device 102 has a low battery capacity, it can offload a power-intensive task to another device (e.g., device 110).

In yet further examples, a local or remote server (e.g., device 114) can offer its functionality to devices in a modular manner. For example, a server with high processing capacity can be accessed and used by the module 104 or modular device 102 to carry out processor-intensive tasks.

To enable the ad-hoc combinations described above, modules can be enabled to: discover each other's presence and availability; advertise their own availability, capabilities, and price; negotiate use of other modules' resources; identify tasks that can be suitable for a current environment that includes certain modules; and/or partition tasks such that parts of the task can be performed by the different modules to complete the task. Particular example components for performing these functions will be discussed further below, for example with reference to FIGS. 3 and 7.

In addition, as will be discussed further below, modules and modular devices of the present disclosure can be capable of performing task management based on a particular context of computing resources that are currently available to the modular electronic device. In particular, the modular electronic device can select one or more tasks to perform based on the sensed context of currently available resources.

Figure 2:
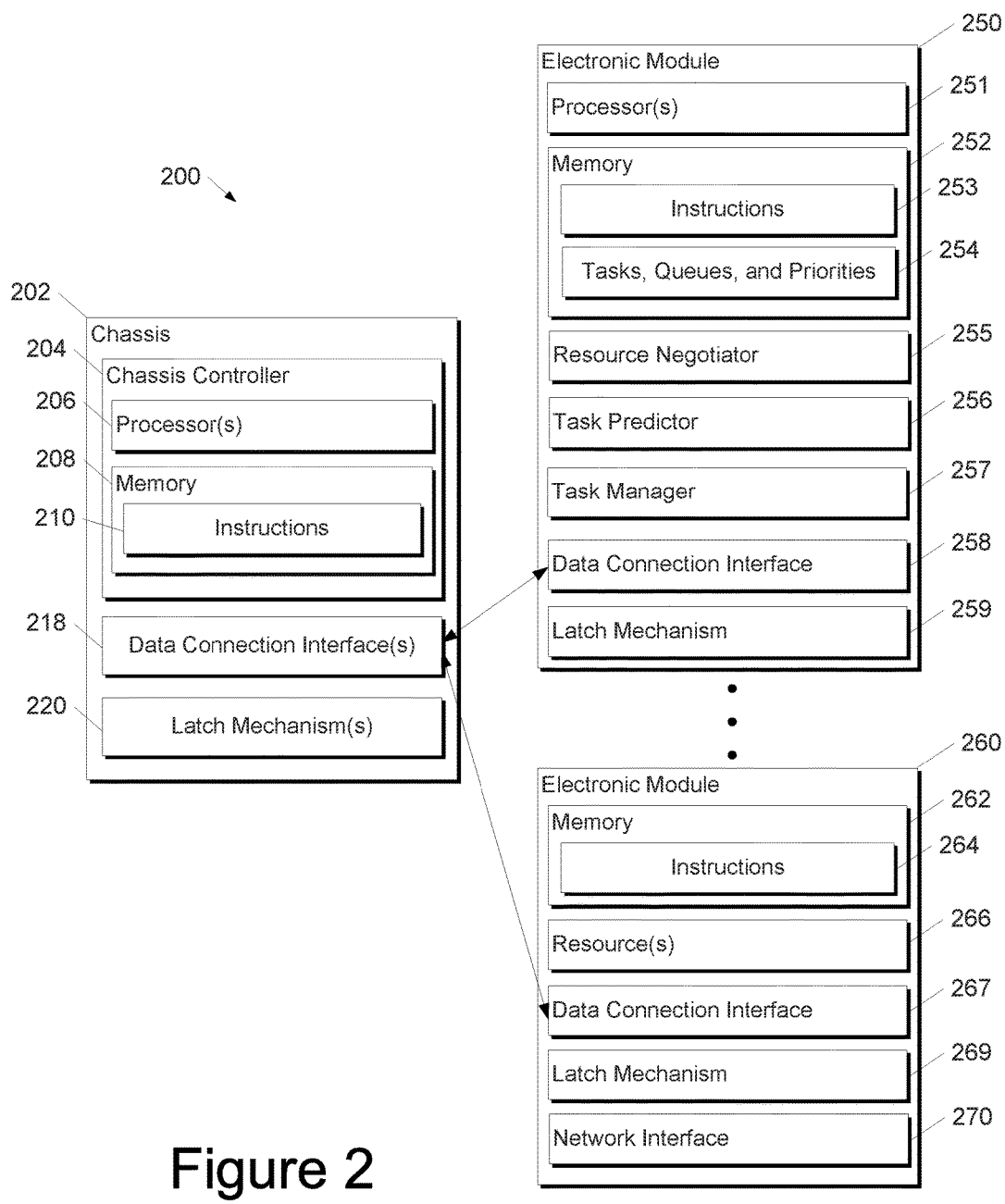
FIG. 2 depicts a block diagram of an example modular electronic device according to example embodiments of the present disclosure.

FIG. 2 depicts a block diagram of an example modular electronic device 200 according to example embodiments of the present disclosure. The example modular electronic device includes a chassis 202 and a plurality of electronic modules. Two representative example electronic modules 250 and 260 are illustrated in FIG. 2 for the purposes of explanation. However, the modular electronic device 200 can have any number of electronic modules. In particular, the number of electronic modules included in the modular electronic device 200 can change over time as modules are swapped in and out of the chassis 202.

The chassis 202 can include a chassis controller 202, one or more data connection interfaces 228, and one or more latch mechanisms 220. In some implementations, the chassis 202 can include a frame which has a number of slots or "bays" into which the modules 250 and 260 are removably received. The chassis 202 can serve as an endoskeleton or backbone to provide structure and shape to the modular electronic device 202. For example, the chassis 202 can include a front backplane and a rear backplane with electronic components of the chassis positioned therebetween.

The chassis controller 204 can include one or more processors 206 and a memory 208. Processor 206 of the chassis controller 202 can be any suitable processing device (e.g., microprocessor; microcontroller; ASIC; FPGA; etc.) and can be one processor or a plurality of processors that are operatively connected.

Memory 208 can include any number of non-transitory storage media such as RAM, ROM, flash, EEPROM, EPROM, hard drives, etc. The memory 208 can store processor-executable instructions 210. Execution of the instructions 210 stored in memory 208 by the processor 206 can cause the chassis controller 204 to perform operations consistent with the present disclosure (e.g., provide system-level management of interaction between the electronic modules 250 and 260).

The chassis 202 can also include at least one data connection interface 218 that communicatively couples the plurality of electronic modules to the chassis controller 204. As one example, the chassis 204 can include at least one data connection interface 218 in each of the plurality of slots or bays. The at least one data connection interface 218 can provide bi-directional communications between the chassis controller 204 and the electronic module via one or more electrical, magnetic (e.g., inductive), or optical couplings between the interface 218 and the corresponding module (e.g., with a complementary data connection interface of the electronic module). As an example, the data connection interface 218 of each bay can include a number of complementary pairs of prongs, pins, contacts, or the like to form a number of serial data connections or other forms of data connection. In other implementations, the at least one data connection interface 218 of the chassis 202 can perform wireless communication with one or more of the electronic modules (e.g., according to a short-range wireless communications protocol such as Bluetooth).

The chassis 202 can also include one or more latch mechanisms 220 which serve to selectively retain electronic modules within their respective bays. In some implementations, the chassis 202 includes at least one latch mechanism 220 within each of the plurality of bays. As one example, the latch mechanism 220 within each bay can include an electropermanent magnet included in the chassis. When activated, the electropermanent magnet creates a magnetic field that serves to magnetically hold the electronic module within the bay.

As another example, in some implementations, each bay can include a fixed retention member associated with a wall or surface of the bay and each electronic module can include a release member at least partially housed within the associated module housing that is configured to releaseably engage the retention member. In some implementations, the retention member can correspond to a projection or lip extending outwardly from the floor or bottom surface of the bay and the release member can correspond to an actuatable hook at least partially housed within the module housing. In other implementations, the respective locations and configuration of the retention/release members can be reversed, with the retention member being associated with the electronic module and the release member and electromechanical actuator being associated with the bay.

In some implementations, the chassis 202 further includes one or more buttons on a side of the chassis. For example, the buttons can be the same as or similar to volume control buttons typically seen on mobile computing devices. In yet further implementations, the chassis 202 can include a switch that has at least one component that is temporarily pullable away from the chassis by a user. The pullable component can retract once released by the user. The switch can enable selective release of modules from the chassis 202.

The example electronic module 250 can include one or more processors 251 and a memory 252. Processor 251 of the module 250 can be any suitable processing device (e.g., microprocessor; microcontroller; ASIC; FPGA; etc.) and can be one processor or a plurality of processors that are operatively connected. Memory 252 can include any number of non-transitory storage media such as RAM, ROM, flash, EEPROM, EPROM, hard drives, etc. The memory 252 can store processor-executable instructions 253. Execution of the instructions 253 stored in memory 252 by the processor 251 can cause the module 250 to perform operations consistent with the present disclosure.

In other implementations, the module 250 does not include the processor 251. For example, the module 250 may simply include the instructions 253 stored in memory 252. Another, different module connected to the chassis 202 can include a processor that can load the instructions 253 from the memory 252 and execute the instructions 253. Thus, the modular device 200 can include a number of modules which cooperatively operate to serve as a single device and/or perform desired operations.

In some implementations, the memory 252 further stores data 254 that describes one or more computing tasks; one or more queues of computing tasks; and one or more priorities (e.g., global priorities, intra-queue priorities; inter-queue priorities; etc.) respectively associated with the one or more computing tasks and/or the one or more queues of computing tasks.

More particularly, the modular electronic device 200 can have certain computing tasks that it may need to perform.

For example, the tasks can be predefined tasks, user-requested tasks, tasks that have been predicted to be desired in the future, background tasks, autonomous tasks, or other types of computing tasks. The tasks can be related to module 250 or other modules. Generally, each task to be performed by the device can have a corresponding set of resources that are required to perform such tasks. Furthermore, various types of priorities can be assigned to the tasks and/or queues. Thus, the memory 252 of the module 250 can store data 254 that describes each of the tasks, their respective required resource, priorities, etc.

The electronic module 250 can further include a resource negotiator 255, a task predictor 256, and a task manager 257. The electronic module 250 can implement the resource negotiator 255 to negotiate use of other modules' or devices' resources by the electronic module 250 and/or negotiate use of the resources of module 250 by other modules or devices. In some implementations, the resource negotiator 255 can implement a sense protocol which enables module 250 and other modules/devices to discover each other's presence and availability and advertise their own respective availability, capabilities, and price. Negotiations can result in agreed upon costs or other exchanges to compensate for use of the resources of other modules/devices.

The electronic module 250 can implement the task predictor 256 to suggest or predict one or more tasks that the user may wish to be performed with the currently available resources of other modules and devices. As an example, the task predictor 256 can predict one or more tasks expected to be requested in the future by analyzing past task data to identify one or more patterns of task requests. Different sets of resources can be associated with the different patterns of task requests. In response to detecting that a particular set of resources are available, the task predictor 256 can suggest (e.g., cause display of) a list of tasks that make use of such particular set of resources. The user can be enabled to select one or more of the listed tasks for performance.

The electronic module 250 can implement the task manager 257 to manage performance of one or more computing tasks based on a particular context of computing resources currently available to the modular electronic device 200. In particular, the task manager 257 can select one or more tasks to perform based on the sensed context of currently available resources. For example, the task manager 257 can monitor currently available resources and capabilities and can compare such currently available resources to required resources associated with various tasks and/or queues of tasks (e.g., as described by data 254). Based on such comparison, the task manager 257 can identify one or more tasks that are currently performable by the ad hoc combination of devices and can cause performance of one or more of the performable tasks. Thus, the task manager 257 can consistently optimize task performance based on available resources.

As an example, when the resources required for performance of one or more tasks become available (e.g., as other modules or other devices enter the ad hoc combination of modules/devices), the task manager 257 can identify that the one or more tasks are capable of being performed by the currently available resources. The resource negotiator 255 can negotiate with one or more modules/devices to obtain use of the required resources so that the one or more tasks can be performed.

In some implementations, the task manager 257 can perform the above described process automatically. As an example, the task manager 257 can continuously monitor resource availability and autonomously manage task performance according to a set of guidelines. For example, the task manager 257 can determine appropriate tasks to perform for the available capabilities based on predefined goals or preferences specified by a user, default operations, or other settings or guidelines.

In other implementations, the task manager 257 can recognize that one or more tasks are capable of being performed and can notify a user of the device regarding such capability. The user can select one of the performable tasks and the task manager 257 can cause the task to be performed (e.g., by instructing or otherwise cooperating with resource negotiator 255 to negotiate use of the required resources). Thus, the task manager 257 can notify the user of the availability of resources and permit the user to choose a particular task to perform.

According to an aspect of the present disclosure, the task manager 257 can assign a global priority to each of the computing tasks. The global priority for each task can generally describe an importance of having the task performed relative to all other tasks. For example, a task that is required to be performed within the next hour may have a superior or more significant global priority relative to a background cleanup task that does not have a deadline. The task manager 257 can assign the global priority according to any prioritization scheme (e.g., scoring, ranking, banded, hierarchical, etc.). In some implementations, one or more global priorities can be assigned by the user to one or more tasks (e.g., via interaction with a user interface).

In some implementations, the task manager 257 can use the global priority to assist in selecting the particular task for performance. As one example, if the available resources are sufficient to perform only one of several tasks, the task manager 257 can select the task with the most significant priority for performance. As another example, the global priority can be one factor of several considered by the task manager 257 when selecting tasks for performance.

According to another aspect of the present disclosure, in some implementations, the task manager 257 can place tasks within one or more queues. In particular, the task manager 257 can create and manage task queues which are associated with certain set(s) of devices/functionalities. In some implementations, tasks which share some or all of the same required set of resources can be placed within a shared queue. Alternatively or in addition to resource requirements, the task manager 257 can use various other factors or variables to assign a task to a particular queue. In some implementations, a single task can be assigned to multiple queues. In some implementations, respective portions of a task (e.g., "tasklets") can be assigned into different respective queues. Thus, tasks can be grouped into queues tasks based on resource requirements and/or other factors.

According to another aspect of the present disclosure, in some implementations, the task manager 257 can maintain sub-queues of tasks within a particular queue. For example, sub-queues within a queue can be formed and maintained based on priority levels, resource requirements, task status, module correspondence (e.g., which module or application requested the task), project correspondence (e.g., which greater project is this task in furtherance of), or other task variables. Further, respective tasklets derived from a particular task can be assigned to different sub-queues based on priority, resource requirements, etc.

According to another aspect, in some implementations, alternatively or in addition to the use of sub-queues, the task manager 257 can assign an intra-queue priority to each task within each queue. The intra-queue priority for each task generally describes the importance of such task relative to other tasks included within the same queue. In some implementations, the intra-queue priority for each task can be based on or otherwise reflective of the global priority assigned to such task. The intra-queue priority can be assigned according to any prioritization scheme (e.g., scoring, ranking, banded, hierarchical, etc.). In some implementations, one or more intra-queue priorities can be assigned by the user (e.g., via interaction with a user interface).

According to yet another aspect of the present disclosure, in some implementations, the task manager 257 can assign an inter-queue priority to each of the queues of computing tasks. Thereafter, the task manager 257 can select one or more particular queues of tasks for performance based on their respective inter-queue priorities. For example, a first queue that includes one or more performable tasks can be selected for performance in favor of a second queue if the first queue has a superior inter-queue priority.

In some implementations, the task manager 257 can determine the inter-queue priority for a particular queue based on the global priorities associated with the tasks included within such queue. As one example, the inter-queue priority for a particular queue can be equal to or otherwise based on a cumulative or aggregate priority associated with all of the tasks included within such queue. As another example, the inter-queue priority for a particular queue can equal or otherwise be based on the most significant global priority assigned to one of the tasks included within such queue. In other implementations, the inter-queue priority is independent from or otherwise uninfluenced by the global priorities associated with tasks included within such queue.

Each of the resource negotiator 255, the task predictor 256, and the task manager 257 include computer logic utilized to provide desired functionality. Thus, each of the resource negotiator 255, the task predictor 256, and the task manager 257 can be implemented in hardware, application specific circuits, firmware and/or software controlling a general purpose processor. In one embodiment, each of the resource negotiator 255, the task predictor 256, and the task manager 257 are program code files stored on the storage device, loaded into memory and executed by a processor or can be provided from computer program products, for example computer executable instructions, that are stored in a tangible computer-readable storage medium such as RAM, hard disk or optical or magnetic media. The resource negotiator 255, the task predictor 256, and the task manager 257 can each correspond to one or more different programs, files, circuits, or sets of instructions. Likewise, two or more the resource negotiator 255, the task predictor 256, and the task manager 257 can be combined into a single program, file, circuit, or set of instructions. In some implementations, one or more of the resource negotiator 255, the task predictor 256, and the task manager 257 are included within a sense unit of the electronic module 250. For example, the resource negotiator 255 can be included within a sense unit of the electronic module 250 or vice versa.

The electronic module 250 can further include a data connection interface 258 and a latch mechanism 259. In some implementations, the data connection interface 258 is the same as, similar to, or complementary to the data connection interface 218 described above. For example, the data connection interface 258 can include a number of prongs, pins, or other electrical connections that are designed to mate with complementary connections at the data connection interface 218. In some implementations, the latch mechanism 259 is the same as, similar to, or complementary to the latch mechanism 220 discussed above.

The example electronic module 260 can include many of the same components as the electronic module 250: such as a memory 262 that stores instructions 264; a data connection interface 267; and a latch mechanism 269.

Further, the electronic module 260 can include components that are distinct from those included in the module 250. Such can enable the module 260 to provide or offer services or functionality that is different than that provided by the module 250. For example, the electronic module 260 can include any number of components that provide various resources 266. For example, the resources 266 can be general resources such as processing power, storage capability, or communication bandwidth, or can be specialized resources, including, for example, specialized hardware such as a camera, a graphics processing unit, a blood pressure monitor, a fingerprint scanner, a flashlight, a speaker, etc.

As one example resources, the module 260 includes a network interface 270. The network interface 270 can include any components or configuration suitable for communication over one or more networks, including, for example, one or more ports, transmitters, wireless cards, controllers, physical layer components, or other items for communication according to any currently known or future developed communications protocol or technology. Thus, as an example, module 260 can negotiate to provide module 250 with use of its network interface 270 to communicate with other modules or devices over one or more network.

Furthermore, the modular electronic device 200 illustrated in FIG. 2 is provided as one example only. Modular electronic devices of the present disclosure can have many designs that are different or alternative to the modular electronic device 200 of FIG. 2. For example, certain modular electronic devices may not have a chassis 202, but rather consist solely of modules that are physically coupled to each other.

According to another aspect of the present disclosure, to enable provision of functionality by different modules and local or remote devices or servers to each other, modules can include functions to advertise their presence and capabilities to other devices/modules. Modules can also detect other modules that are available and their associated capabilities. In some implementations, a module can include one or more sense units which are used for such communications.

Figure 3:
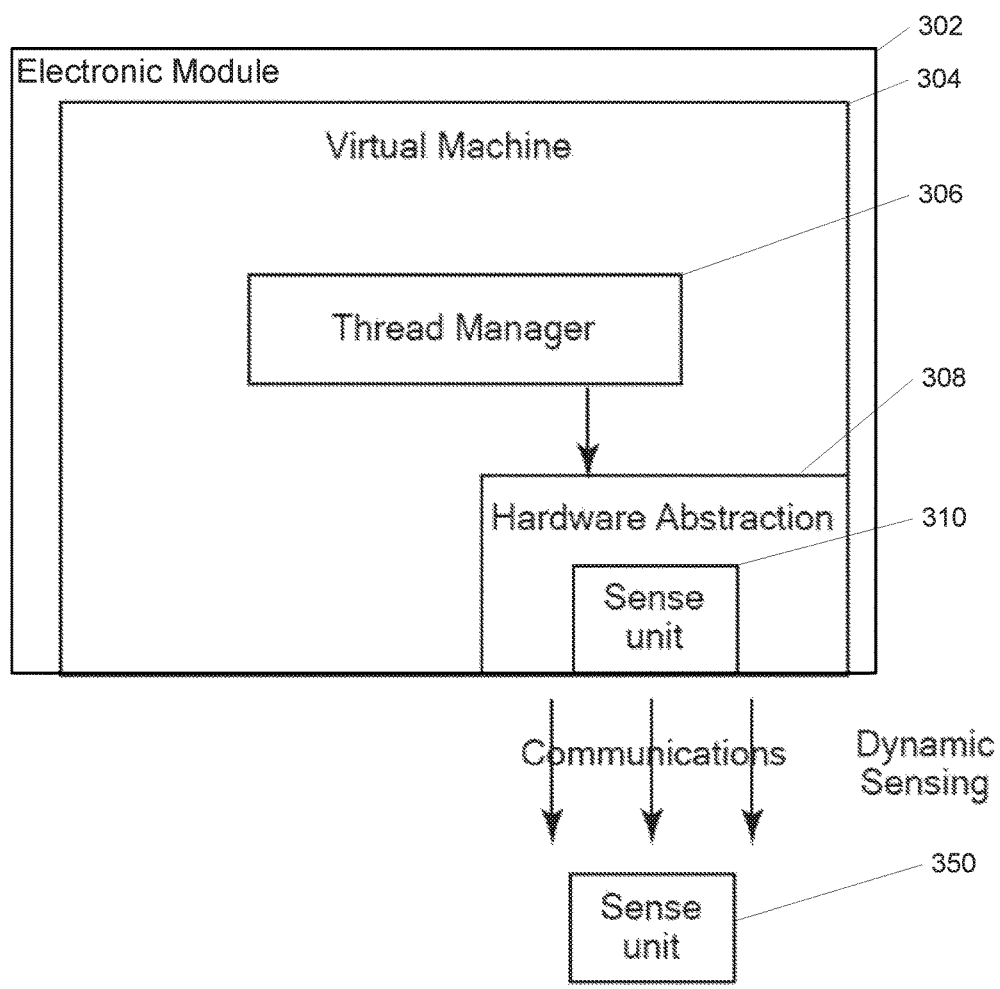
FIG. 3 depicts a block diagram of an example module according to example embodiments of the present disclosure.

In particular, FIG. 3 depicts a block diagram of an example electronic module 302 according to example embodiments of the present disclosure. The electronic module 302 includes a virtual machine 304 running on the module 302 that can, for example, evaluate the capabilities of the module. The virtual machine 304 can also coordinate the communication and use of capabilities between the module 302 and other modules/devices. For example, the virtual machine 304 can determine if needed capabilities for a task are not available on the module and determine how to obtain or perform those capabilities, (e.g., by connecting with other modules, server devices, or other devices and obtaining needed resources).

In some implementations, the module 302 implements the virtual machine by executing, with a processor, instructions stored in a memory. In other implementations of the present disclosure, modules can perform the above described functions without using a virtual machine.

In the example module 302 of FIG. 3, the virtual machine 304 includes a thread manager 306 to manage operations of the virtual machine 304. The thread manager 306 can oversee and distribute different threads. For example, threads can include tasks that are to be performed by the module. The thread manager 306 can interface with a hardware abstraction layer 308. The hardware abstraction layer 308 can include a sense unit 310.

Each of the thread manager 306 and the sense unit 310 include computer logic utilized to provide desired functionality. Thus, each of the thread manager 306 and the sense unit 310 can be implemented in hardware, application specific circuits, firmware and/or software controlling a general purpose processor. In one embodiment, each of the thread manager 306 and the sense unit 310 are program code files stored on the storage device, loaded into memory and executed by a processor or can be provided from computer program products, for example computer executable instructions, that are stored in a tangible computer-readable storage medium such as RAM, hard disk or optical or magnetic media.

According to an aspect of the present disclosure, the sense unit 310 can be configured to monitor and determine current statuses and capabilities of the module 302. The sense unit 310 can also configured to communicate with other, corresponding sense units (e.g., sense unit 350) outside the virtual machine 304, including, for example, sense units in other modules or devices. For example, a sense unit (e.g., units 310 and 350) can be a small component provided on various modules intended to use described features.

The sense unit 310 can advertise a capability of the module 302. The sense unit 310 can communicate with other sense units (e.g., unit 350) outside the virtual machine 304 through various available communication modalities. For example, the sense unit 310 can use Near-Field Communications (NFC), Bluetooth, or other short range wireless protocols for such communication.

In some instances, where the sense unit 310 is part of a module 302 that itself is part of a modular device that includes other modules, the sense unit 310 can communicate with other sense units using inter-process communication (IPC) within the device (e.g., by way of one or more data connection interfaces). In other instances, the sense unit 310 can communicate with remote sense units (e.g., sense units at a remote server) over a wide area network (e.g., the Internet). In some cases, the sense unit 310 can utilize a physical connection, such as, for example, a connection over a port (e.g., USB), a wired network interface, a proprietary interface, or physical connections to communicate with other sense units.

The sense unit 310 can be capable of identifying other sense units that correspond to modules of the same or similar type. In some examples, similar modules can determine that a connection between the modules is secure.

According to another aspect of the present disclosure, a module can advertise its presence and capabilities. In particular, in the example module 302 illustrated in FIG. 3, the sense unit 350 can advertise or describe the functionality of the module 302. In some implementations, the sense unit 310 of the module 302 can broadcast information listing one or more capabilities of the module. For example, such broadcast can be periodic, or triggered by certain conditions. In other implementations, the sense unit 310 can advertise only the presence of the module 302, and can receive and respond to requests to describe capabilities of the module 302.

In one example simple protocol, the module 302 can advertise its general functionality. For example, the advertised information can include an available processing power, a memory/storage capability, a communication bandwidth, or other information concerning the module 302.

In other examples, specialized modules can advertise specific or specialized functionality. For example, specialized functionality can include the ability to capture images with a certain quality, the ability to efficiently implement a mathematical function such as a Fourier transform or a cryptographic function, or other specialized functions.

In some example protocols, modules can also advertise additional details about their capabilities. For example, the module 302 can advertise its communication capabilities in terms of distance, protocol or speed of which the module is capable. As examples, an advertisement can indicate the following information: "Bluetooth, up to 20 m, at a rate of X kbps"; "cellular, long-distance capable, at a rate of Y mbps"; etc.

In some example protocols, modules can similarly describe their processing functionality in more detail. For example, advertisements can include information about the module's ability to process a standard task within a period of time. For example, modules can describe memory capabilities in terms of permanent and/or non-permanent storage, amount of storage available, speed of storage, etc. The module can also describe other capabilities such as power availability, guest mode and/or user authorization, security and/or privacy settings, etc.

In some instances, module 302 can be capable of performing certain software operations and module 302 can advertise these software operations. For example, module 302 can be capable of and advertise its ability to transcode a video stream, render a 3-D animation based on input data, etc.

In some implementations, module 302 can selectively enable discovery of use-case specific software applications that might be of interest to other modules. For example, if module 302 detects an advertised request from a second module for a particular application, module 302 can, in response, start advertising its capability of providing functions of that application.

According to another aspect of the present disclosure, the module 302 can advertise its availability and price. For example, module 302 can also advertise its availability in terms of available time or duration and/or available units of capability. Units of capability can be standardized. Module 302 can further advertise a price for utilization of its capabilities. In some examples, module 302 can charge different prices for different types of tasks, e.g., different prices for interruptible and non-interruptible tasks. Accounts can be associated with various modules or devices. Prices or other costs to be assessed against such accounts in exchange for use of resources or other task performance.

In some implementations, the module 302 can dynamically update its advertised availability and price based on a changing environment of connected modules and tasks. For example, existing tasks can be completed and new tasks initiated, creating different demands for capabilities of the module 302 in a module network. In another example, one or more modules can be brought into or removed from a module network (e.g., based on communication range), thus changing the availability of resources and potentially changing the price of offered capabilities. In another example, module 302 can periodically broadcast different availability/price based on utilization of the module's resources by other modules.

According to another aspect of the present disclosure, module 302 can accept tasks to perform. In particular, module 302 can receive multiple requests from other modules to utilize its capabilities. Requests can include parameters such as a time duration for which the capabilities of the module 302 are required, whether the task is interruptible, a price that the requester is offering, a Quality-of-Service requirement, and other parameters. The module 302 can, based on the incoming requests and local information, accept one or more of the requests. The requests can be accepted in a particular order or in parallel. The module 302 can have one or more budgets (e.g., a computing budget, a power budget, a memory budget, etc.) and can refuse requests that exceed one or more of such budgets.

In one example, the module 302 is part of video-conferencing hardware and includes a many-core graphics processing unit ("GPU"). The module 302 can have local information regarding reservations or demand for the video-conferencing hardware. Based on this information, the module 302 can advertise availability of its capabilities at certain times, for example, at a time when no video-conference is scheduled.

Further, the module 302 can be capable of performing multiple incoming tasks in parallel (e.g., using different subset cores of a many-core GPU). In this example, the module 302 can accept a single request to use the entire GPU or a combination of requests that together utilize the GPU. Further, the module 302 can predict a future demand (e.g., based on historical usage) and reserve its resources based on such predicted future demand.

The module 302 can perform a negotiation with a requester through its sense unit using a sense protocol. For example, the module 302 can make itself available in discrete chunks of time and permit a requester to make reservations. Further, the negotiation can permit a requester to specify whether a task is non-priority (e.g., a background processing task). In this example, the module 302 can offer a lower price (e.g., corresponding to relaxed performance requirement) to the requester.

In some implementations, the module 302 can be capable of serving only one requester at a time. In such implementations, the module 302 can choose one of the incoming requests, for example, based on the offered price, time duration, or other parameters associated with the request.

Thus, the module 302 is capable (e.g., by way of the sense unit 310), of discovering the presence and availability of other modules or devices and is capable of advertising its own availability, capabilities, and price. The module 302 can negotiate use of other modules' resources, identify tasks suitable for a current module network environment, and assign tasks using resources of different modules to complete the tasks. Particular examples of the above-described principles and functions will now be discussed in further detail.

Example Usage Scenarios

Figure 4:
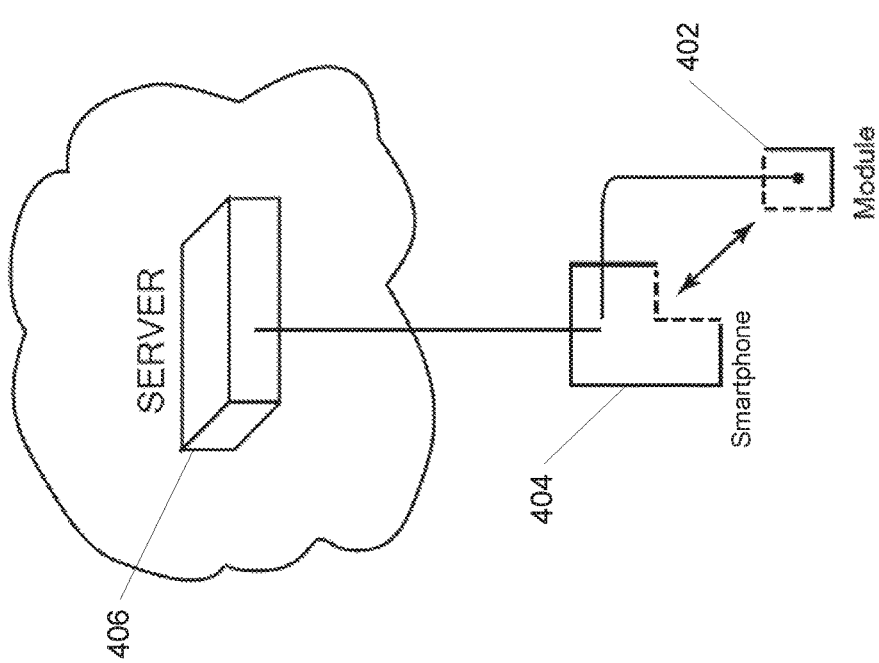
FIG. 4 depicts a block diagram of an example module in communication with an example smartphone according to example embodiments of the present disclosure.

In a first example scenario, a module can connect to a server through a smartphone. As an example, FIG. 4 depicts a block diagram of a module 402 in communication with a smartphone 404, which in turn is in communication with a server 406. The smartphone 404 may or may not be modular in nature. The smartphone 404 is provided as an example computing device. Other computing devices can be used in place of the smartphone 404 (e.g., a laptop computer or another module).

In the example illustrated in FIG. 4, the module 402 may be capable only of short-range wireless communication. Thus, in the illustrated example, the module 402 may be capable of communicating only with the smartphone 404 because the smartphone 404 is the only device within communication range of the module 402.

A sense unit or other component of the module 402 can discover one or more capabilities offered by or through the smartphone 404. Some capabilities can be offered directly by the smartphone 404. For example, the capabilities can be accessed from another physically connected module of the phone. As another example, some resources or capabilities can be offered by the server 406 that is communicatively connected to the smartphone 404. The server 406 can be a remote server or a local server. The smartphone 404 (e.g., a sense unit of the smartphone 404) can relay information regarding these resources to the module 402 or other devices.

In some implementations, the module 402 can detect the available resources offered by the smartphone 404 and choose a task to be performed. In some implementations, the sense unit or other component of the module 402 can communicate a requirement (e.g., for a particular resource such as a processor) to the smartphone 404 and request the smartphone 404 to obtain such a capability (e.g., through the server 406). The phone 404 can in turn relay such a request to the server 406 and if the resources are available, relay the availability to the module 402. Such communication can proceed through multiple hops between the module 402 and the server 406.

Figure 5:
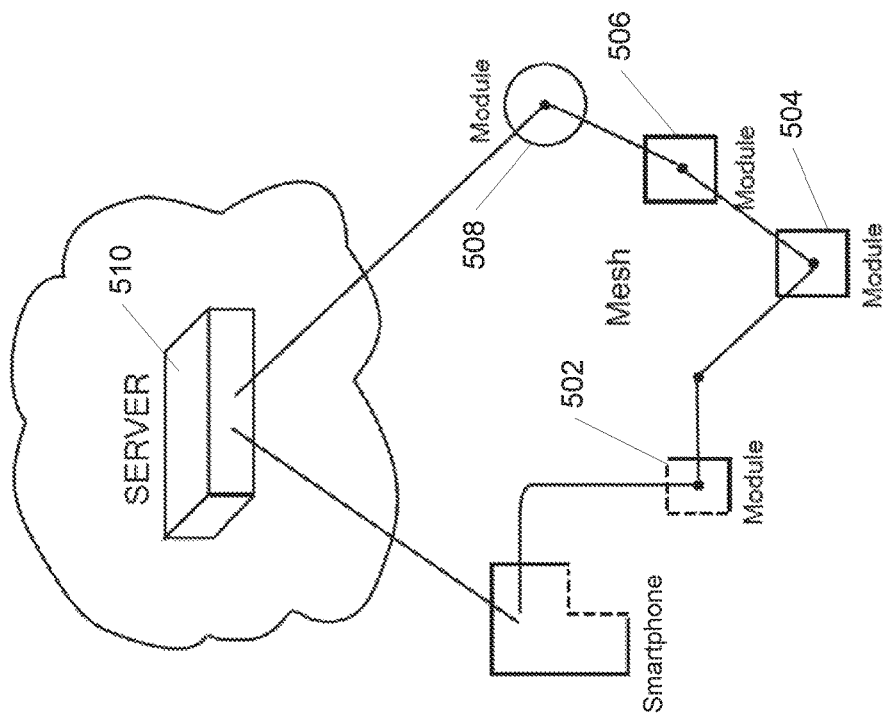
FIG. 5 depicts a block diagram of an example module connected to other modules through a mesh network according to example embodiments of the present disclosure.

In a second example scenario, a module can connect to other modules in a mesh network and to a server through a smartphone. As an example, FIG. 5 shows a module 502 similar to module 402 of FIG. 4. The module 502 of FIG. 5 can be additionally capable of communicating with one or more other modules 504, 506, and 508. For example, the modules 502-508 can communicate through a mesh network, as illustrated. The other modules 504-508 of the mesh network can each offer capabilities (e.g., resources) and can relay requests to and from the module 502, including, for example, to a server 510. The module 502 can select from the available resources, for example, based on a sense protocol as described above.

Figure 6:
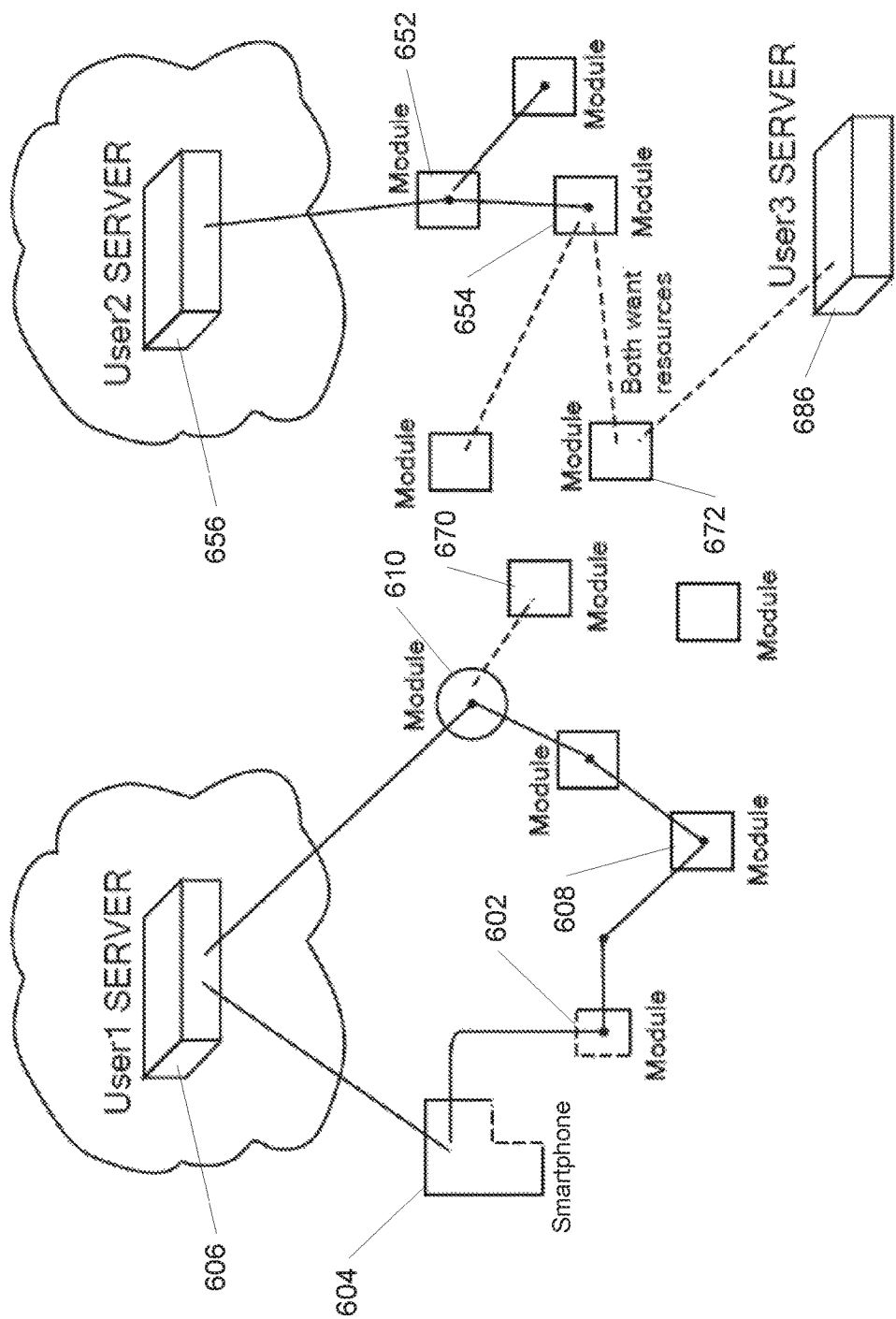
FIG. 6 depicts a block diagram of example modules and mesh networks associated with specific users according to example embodiments of the present disclosure.

In a third example scenario, modules and mesh networks can be associated with specific users. As an example, FIG. 6 shows a smartphone 604 in communication with a "User1 server" 606. For example, the phone 604 can be part of a mesh network including a module 602 associated with a user named "User1." Further, the mesh network can include other modules, (e.g., modules 608 and 610) that are part of one or more devices associated with User1. The mesh network associated with the User1 server 606 is shown having modules connected with solid lines to each other and to the User1 server 606.

Similarly, a second mesh network can be associated with a user named "User2," including a User2 server 656 and modules associated with User2 (e.g., module 652 and 654 and other modules connected to User2 server 656 with solid lines). A module of this mesh network can discover and use resources from the other modules or server of the mesh network to perform tasks.

Modules of a mesh network can also communicate with modules of a different mesh network or other modules that can be available. For example, the other modules can be within a particular communication range of the module. In FIG. 6, particular modules of the mesh networks have communicated with other modules within communication range, (e.g., module 670 and 672 and other modules shown in dashed lines). The other modules can be part of their own mesh networks. Multiple user mesh networks can communicate with each other to form larger mesh networks.

In this example, a third user named "User3" that is associated with a server "User3 server" 686 can enter the communication range, (e.g., with a device acting as User3 server 686). The User3 server 686 can communicate with and connect to other modules and mesh networks. The User3 server 686 can receive information about resources available on the mesh network. The User3 server 686 can request a resource from the mesh network.

For example, the User3 server 686 can request a resource from the module 672. If the requested resource of the module 672 is already in use, for example, by the User2 module 654 as shown, the sense protocol of one or more of the involved devices can enable a negotiation. For example, the User3 server 686 can offer a higher price for use of the resource of module 672 than the price to which User2 module 654 initially negotiated. As a result of the negotiation, the User2 module 654 can relinquish the resource of module 672, or the resource of module 672 can accept a request from User3 server 686. Thus, in the above example, there can be competition for resources advertised within the mesh network and the sense protocol can enable negotiation for optimal resource allocation.

Figure 7:
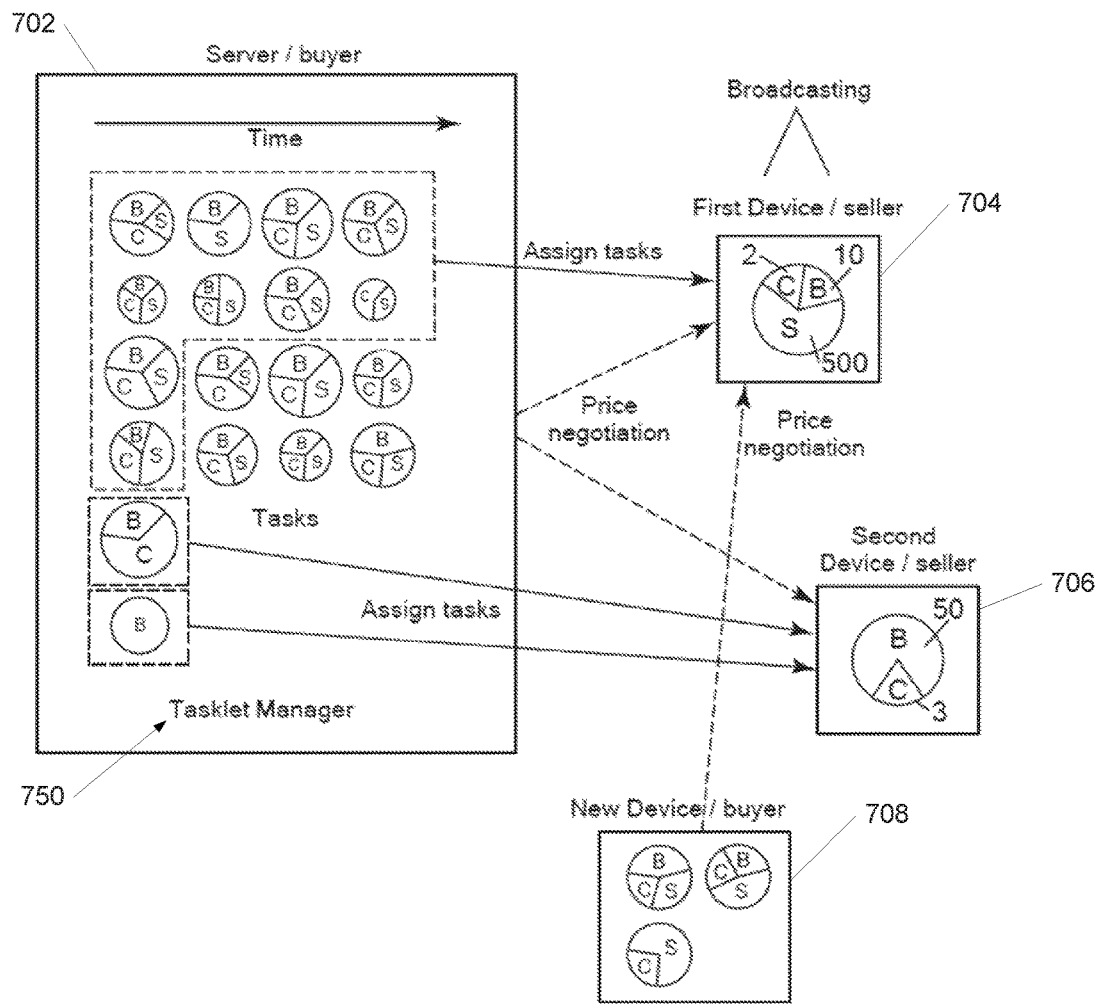
FIG. 7 depicts a block diagram of a central server or local coordinator performing task breakdown and allocation according to example embodiments of the present disclosure.

According to another aspect of the present disclosure, in some implementations, a central server or local coordinator can perform task breakdown and allocation. As an example, FIG. 7 shows an example of task breakdown and allocation by a server 702 among communicating devices 704, 706, and 708. In FIG. 7, the server/buyer 702 can be a module or other device (e.g., modular device or non-modular device) that has one or more tasks to perform at a given time. In other implementations, the server/buyer 702 can be a non-server module or other device. The server/buyer 702 can be part of a communication network (e.g., an ad hoc mesh network) and can be capable of communicating with one or more devices such as devices 704 and 706. The device/sellers 704-706 can be modules or other devices able to communicate with the server/buyer 702 and each other.

The server/buyer 702 can have one or more tasks that it needs to complete. Such tasks can require resources that may not be available within the server 702. In some implementations, a sense unit of the server/buyer 702 can broadcast requests for particular resources that other devices in range can receive. The sense unit of the server/buyer 702 can receive information from other devices regarding different resources available in the mesh network.

For example, a simple sense protocol can enable each device/seller 704 and 706 to advertise its respective capabilities in terms of their available communication bandwidth B (e.g., to other devices), computing capability C, and storage capability S. The sense protocol can specify that the B-C-S capabilities be described in terms of standard units. In one example, a standard unit for compute capability can be millions of instructions per second ("MIPS").

In the example shown in FIG. 7, a first device/seller 704 advertises that it has 10 units of bandwidth, 2 units of computing, and 500 units of storage capability. A second device/seller 706 advertises that it has no storage capability, but has 50 bandwidth and 3 units of computing capability. Further, the sense protocol can enable each device/seller to advertise other parameters such as price for utilization of its resources and a time (or time range) of availability for the resources. For example, a sense unit of a device/seller can transmit or broadcast a tuple {B,C,S; price; time} that includes such information. The transmitted information can change periodically, for example, based on utilization of each device/seller. A more advanced sense protocol can permit the device/seller to specify future prices and units of availability based on predictions of future task needs, for example, after particular tasks complete, new tasks start, etc.

The server/buyer can include a "tasklet manager" 750. The tasklet manager 750 can divide or partition a task into one or more "tasklets." A tasklet can be a small, well-defined unit of work for the task. For example, a tasklet can specify a mathematical operation (or set of operations) to be performed on certain data. In another example, a tasklet can be to communicate an amount of data to a remote server. In yet another example, a tasklet can be to store an amount of data. The tasklet manager 750 can be a component of a general task manager.

A tasklet can specify the resource requirement for a particular amount of time and/or a communication requirement (e.g., bandwidth or physical distance). A tasklet can be interruptible or non-interruptible, for example, based on priority or importance of the tasklet.

A tasklet can require a defined set of resources. The resource requirements for each tasklet can be defined in terms of the bandwidth, compute and storage (B,C,S) and/or other parameters required for the tasklet. In FIG. 7, different illustrated sizes of tasklets can indicate different amounts of resources required to perform those tasklets.

In some implementations, the tasklet manager 750 of the server/buyer 702 can perform the breakdown of tasks based on information received by a sense unit of the server/buyer 702 about available resources (e.g., from each device/seller 704 and 706). For example, the tasklet manager 750 can generate tasklets that are matched to capabilities of the available device/sellers and that efficiently aggregate the capabilities.

The tasklet manager 750 can identify multiple resources that are capable of performing a tasklet and choose among them. For example, two different device/sellers can offer similar compute and bandwidth capability. However, one of the two devices can support a low-power communication protocol. In this example, the tasklet manager 750 can assign the tasklet to the device that supports the low-power communication protocol.

In some examples, the tasklet manager 750 can perform task breakdown independent of the information received by the sense unit. In some examples, the tasklets can be generated before information about resources (e.g., from device/sellers 704 and 706) is available.

The sense protocol can be implemented to permit a price negotiation for resources between the server/buyer 702 and each device/seller 704 and 706, as indicated in FIG. 7. Based on the negotiation, a tasklet can be assigned to a particular device/seller. In some cases, resources required for tasklets can be obtained from multiple devices. In this manner, the server/buyer 702 can complete the task by utilizing resources respectively from the device/sellers 704 and 706.

In the example shown in FIG. 7, a new device/buyer 708 can join the mesh network. Devices in the mesh network can relay capabilities (e.g., resources) offered by the devices and available to the new device/buyer 708. The new device/buyer 708 can engage in price negotiation with a device/seller. For example, in FIG. 7, the new device/buyer engages in price negotiation with the first device/seller 704 and competes with the server/buyer 702 for some resources of the first device/seller 704. In response, the first device/seller 704 can complete a tasklet for the server/buyer 702 and switch to performing a tasklet for the new device/buyer 708, for example, if a price offered by the new device/buyer 708 is higher than that offered by the server/buyer 702.

While the server/buyer 702 and device/seller 704 are shown as different entities, it will be understood that any device or module can act as a buyer or seller, at different times, or simultaneously. For example, a device with excess compute capability and no communication capability can offer compute resources, while simultaneously consuming bandwidth capability from a different device.

In some implementations, a device/seller can accept an incoming resource request on a first-in-first-out basis. In these implementations, there may not be a negotiation.

In other implementations, there may not be a central "tasklet manager." For example, the task can be a standard operation and can specify pre-defined tasklets. In such examples, distributed coordination between different modules can be utilized to complete the task.

In some implementations, the tasklet manager 750 includes computer logic utilized to provide desired functionality. Thus, the tasklet manager 750 can be implemented in hardware, application specific circuits, firmware and/or software controlling a general purpose processor. In one embodiment, the tasklet manager 750 includes program code files stored on the storage device, loaded into memory and executed by a processor or can be provided from computer program products, for example computer executable instructions, that are stored in a tangible computer-readable storage medium such as RAM, hard disk or optical or magnetic media.

Example Methods

Figure 8:
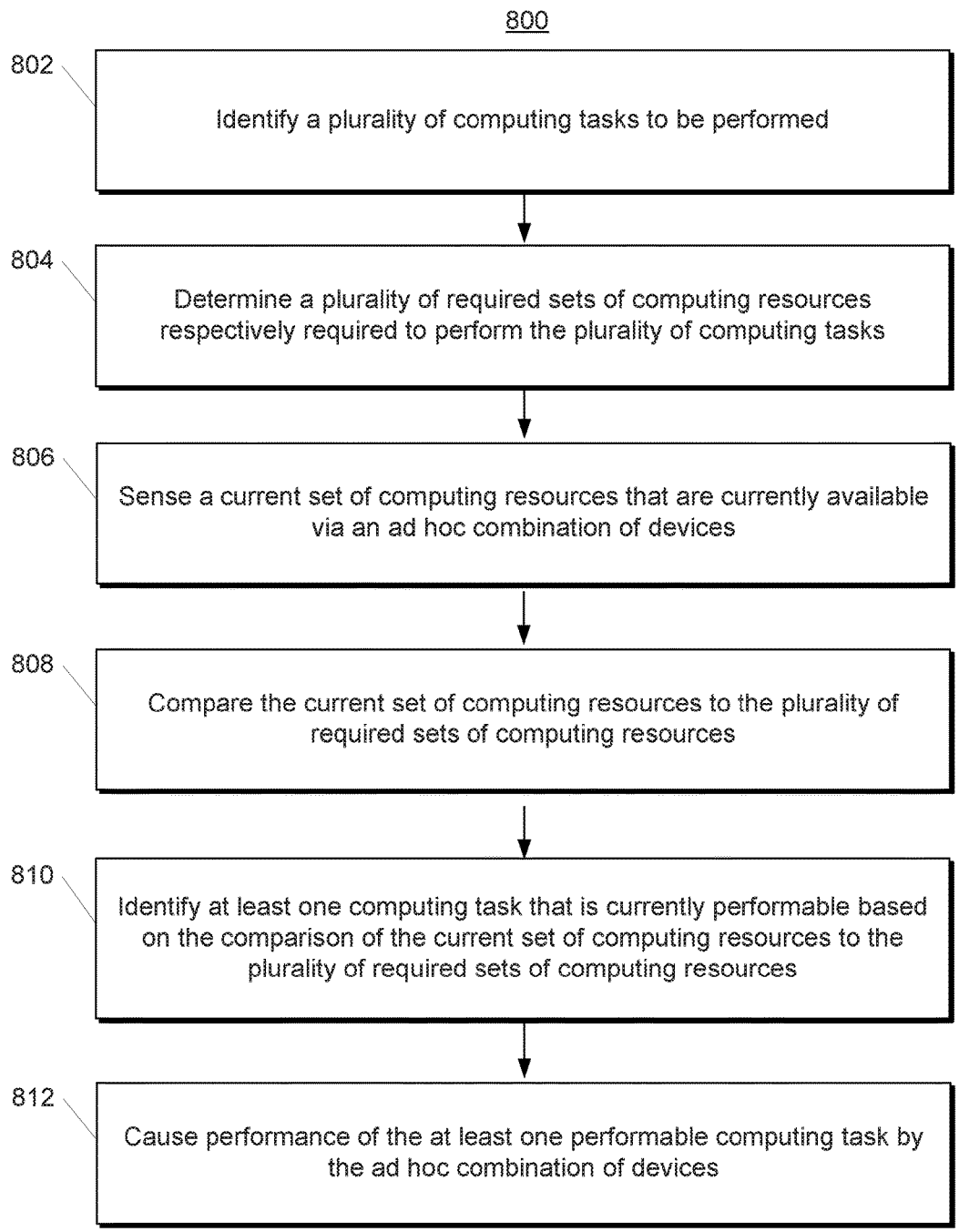
FIG. 8 depicts a flow chart diagram of an example method for contextual task management according to example embodiments of the present disclosure.

FIG. 8 depicts a flow chart diagram of an example method 800 for contextual task management according to example embodiments of the present disclosure. Although method 800 will be discussed with reference to an example modular electronic device, example method 800 can be performed a non-modular device as well.

At 802, a modular electronic device identifies a plurality of computing tasks to be performed. For example, the computing tasks can be processing tasks, storage tasks, communication tasks, etc. The modular electronic device can include one or more modules.

In some implementations, identifying the one or more computing tasks to be performed at 802 can include predicting at least a first computing task that will be requested to be performed in the future.

At 804, the modular electronic device determines a plurality of required sets of computing resources that are respectively required to perform the plurality of computing tasks. For example, each task to be performed can have a corresponding set of resources that are required to perform such tasks. In some implementations, each task can include metadata that describes its particular required resources.

At 806, the modular electronic device senses a current set of computing resources that are currently available via an ad hoc combination of devices. For example, the modular electronic device can implement a sense protocol which enables the device and other modules/devices to discover each other's presence and availability and advertise their own respective availability, capabilities, and price.

At 808, the modular electronic device compares the current set of computing resources to the plurality of required sets of computing resources. In one example, the modular electronic device determines, for each computing task, whether the current set of computing resources satisfies or otherwise provides all of the required computing resources.

At 810, the modular electronic device identifies at least one computing task that is currently performable based on the comparison of the current set of computing resources to the plurality of required sets of computing resources.

At 812, the modular electronic device causes performance of at least one performable computing task by the ad hoc combination of devices. For example, the modular electronic device can negotiate with one or more modules/devices to obtain use of the required resources so that the one or more tasks can be performed.

Figure 9:
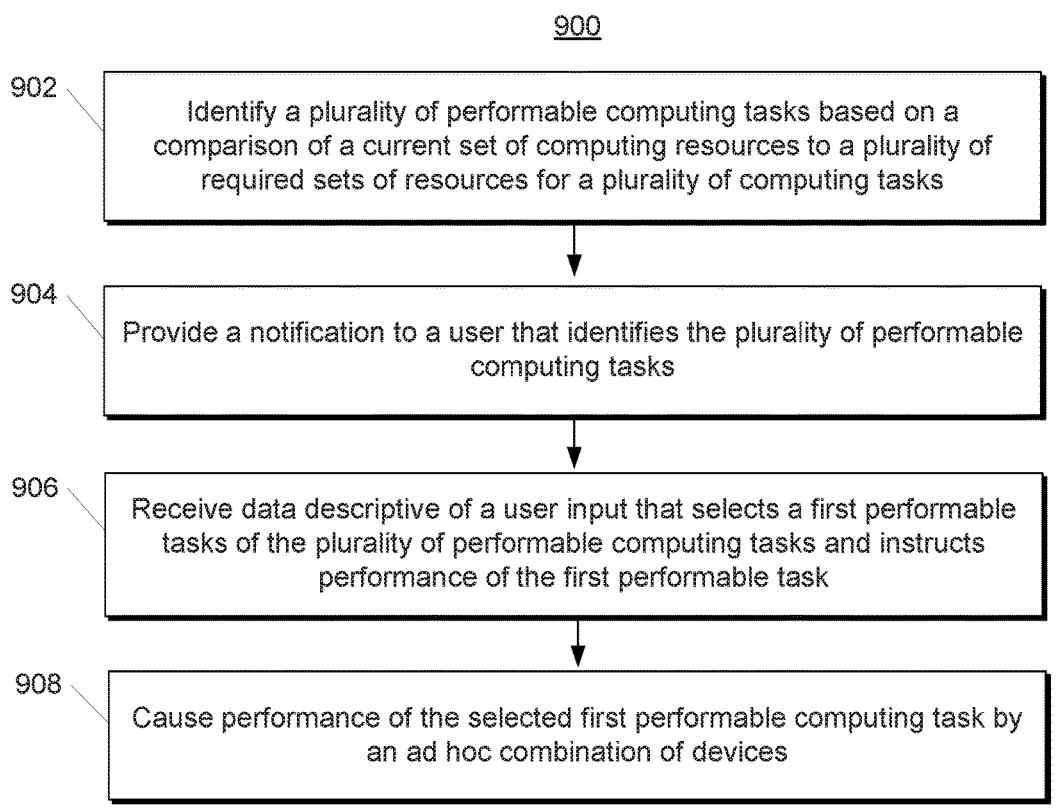
FIG. 9 depicts a flow chart diagram of an example method for user-guided contextual task management according to example embodiments of the present disclosure.

FIG. 9 depicts a flow chart diagram of an example method 900 for user-guided contextual task management according to example embodiments of the present disclosure. Although method 900 will be discussed with reference to an example modular electronic device, example method 900 can be performed by a non-modular device instead.

At 902, the modular electronic device identifies a plurality of performable computing tasks based on a comparison of a current set of computing resources to a plurality of required sets of computing resources respectively associated with a plurality of computing tasks.

At 904, the modular electronic device provides a notification to a user that identifies the plurality of performable computing tasks. For example, the modular electronic device can recognize that a plurality of different tasks are capable of being performed and can notify a user of the device regarding such capability. The notification can be provided, for example, on a display of the device. In some implementations, the notification can provide a negotiated price associated with performance of each task.

At 906, the modular electronic device receives data descriptive of a user input that selects a first performable task of the plurality of performable computing tasks and instructs performance of the first performable task. For example, the user can interact with the notification to select one or more of the tasks. Selection by the user can indicate that such task should be performed.

At 908, the modular electronic device causes performance of the selected computing task(s) by an ad hoc combination of devices. For example, the modular electronic device can negotiate with one or more modules/devices to obtain use of the required resources so that the one or more tasks can be performed.

In some implementations, the user input can further provide a price that the user is willing to pay to have the task performed. For example, the user can interact with the notification to set the price. In response to the user input, the modular electronic device can attempt to negotiate with one or more modules/devices to obtain use of the required resources so that the one or more tasks can be performed, while always remaining within the user-specified price. In some implementations, the user can specify a price beforehand and the device will provide the notification only if it has already negotiated the appropriate resources for a price that is less than the user-specified value.

Figure 10:
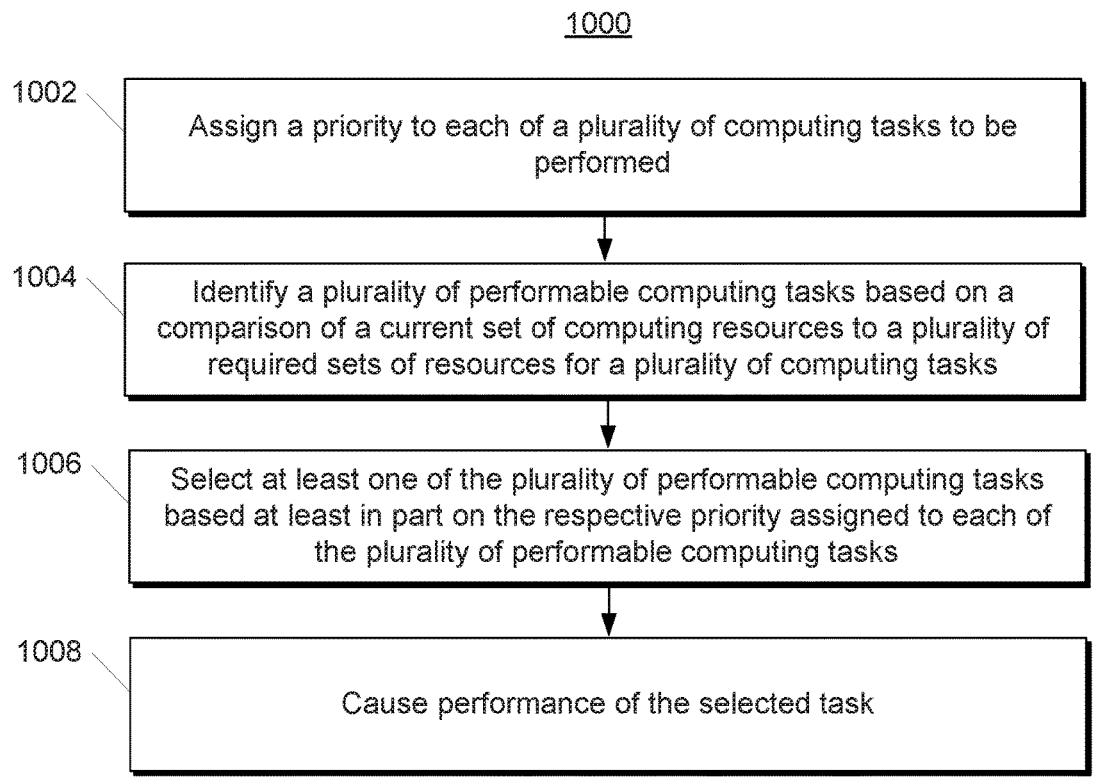
FIG. 10 depicts a flow chart diagram of an example method for task selection based on priority according to example embodiments of the present disclosure.

FIG. 10 depicts a flow chart diagram of an example method 1000 for task selection based on priority according to example embodiments of the present disclosure. Although method 1000 will be discussed with reference to an example modular electronic device, example method 1000 can be performed by a non-modular device instead.

At 1002, the modular electronic device assigns a priority to each of a plurality of computing tasks to be performed. For example, the priority can be a global priority that generally describes an importance of having the task performed relative to all other tasks.

At 1004, the modular electronic device identifies a plurality of performable computing tasks based on a comparison of a current set of computing resources to a plurality of required sets of resources respectively associated with the plurality of computing tasks.

At 1006, the modular electronic device selects at least one of the plurality of performable computing tasks based at least in part on the respective priority assigned to each of the plurality of performable computing tasks. For example, the modular electronic device can select the task with the most significant priority for performance. As another example, the priority can be one factor of several considered by the modular electronic device when selecting tasks for performance.

At 1008, the modular electronic device causes performance of the selected task(s). For example, the modular electronic device can negotiate with one or more modules/devices to obtain use of the required resources so that the selected task(s) can be performed.

Figure 11:
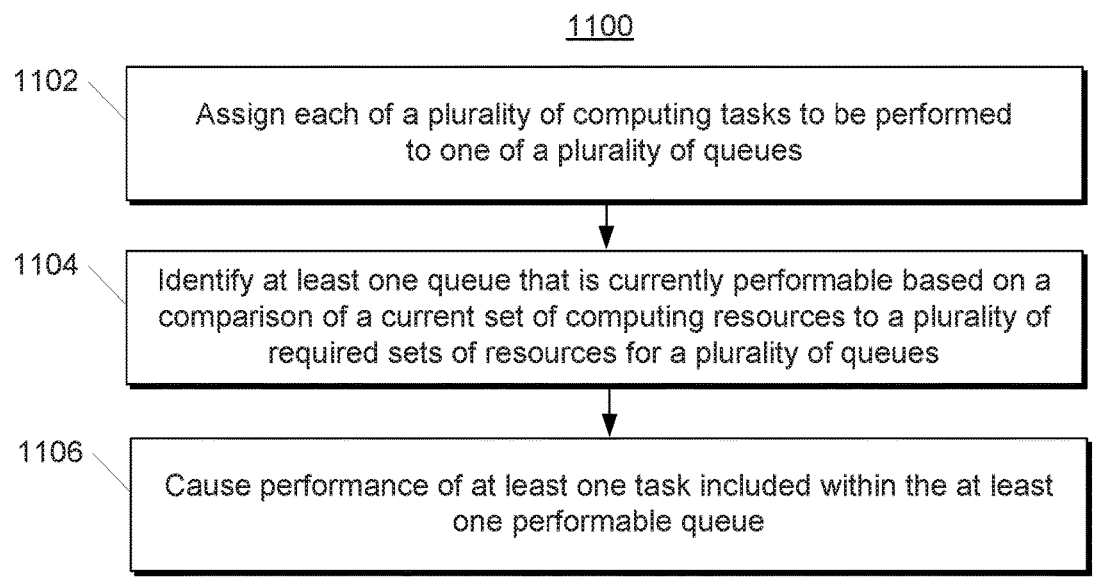
FIG. 11 depicts a flow chart diagram of an example method for contextual task performance according to example embodiments of the present disclosure.

FIG. 11 depicts a flow chart diagram of an example method 1100 for contextual task performance according to example embodiments of the present disclosure. Although method 1100 will be discussed with reference to an example modular electronic device, example method 1100 can be performed by a non-modular device instead.

At 1102, the modular electronic device assigns each of a plurality of computing tasks to be performed to one of a plurality of queues. For example, the modular electronic device (e.g., one of the device's modules) can create and manage task queues which are associated with certain set(s) of devices/functionalities.

In some implementations, tasks which share some or all of the same required set of resources can be placed within a shared queue. Alternatively or in addition to resource requirements, various other factors or variables can be used to assign a task to a particular queue. In some implementations, a single task can be assigned to multiple queues. In some implementations, respective portions of a task (e.g., "tasklets") can be assigned into different respective queues. Thus, tasks can be grouped into queues tasks based on resource requirements and/or other factors.

At 1104, the modular electronic device identifies at least one queue that is currently performable based on a comparison of a current set of computing resources to a plurality of required sets of resources respectively associated with the plurality of queues. For example, the modular electronic device can identify at least one queue for which the current set of resources satisfies or otherwise provides all of the required resources.

At 1106, the modular electronic device causes performance of at least one task included within the at least one performable queue. For example, the modular electronic device can negotiate with one or more modules/devices to obtain use of the required resources so that the at least one task included within the at least one performable queue can be performed.

Figure 12:
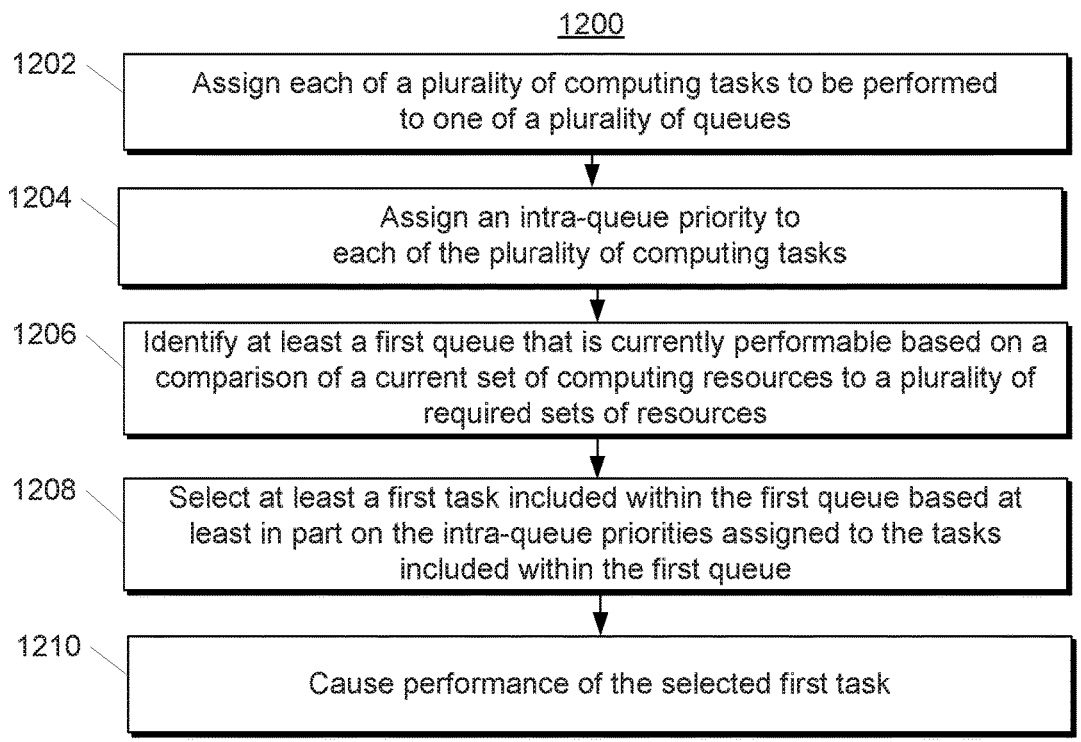
FIG. 12 depicts a flow chart diagram of an example method for task selection based on intra-queue priority according to example embodiments of the present disclosure.

FIG. 12 depicts a flow chart diagram 1200 of an example method for task selection based on intra-queue priority according to example embodiments of the present disclosure. Although method 1200 will be discussed with reference to an example modular electronic device, example method 1200 can be performed by a non-modular device instead.

At 1202, the modular electronic device assigns each of a plurality of computing tasks to be performed to one of a plurality of queues. For example, the modular electronic device (e.g., one of the device's modules) can create and manage task queues which are associated with certain set(s) of devices/functionalities.

At 1204, the modular electronic device assigns an intra-queue priority to each of the plurality of computing tasks. For example, the intra-queue priority for each task can generally describe the importance of such task relative to other tasks included within the same queue.

In some implementations, the intra-queue priority for each task can be based on or otherwise reflective of the global priority assigned to such task. The intra-queue priority can be assigned according to any prioritization scheme (e.g., scoring, ranking, banded, hierarchical, etc.). In some implementations, one or more intra-queue priorities can be assigned by the user (e.g., via interaction with a user interface).

At 1206, the modular electronic device identifies at least a first queue that is currently performable based on a comparison of a current set of computing resources to a plurality of required sets of resources respectively associated with the plurality of queues.

At 1208, the modular electronic device selects at least a first task included within the first queue based at least in part on the intra-queue priorities assigned to the tasks included within the first queue. For example, the modular electronic device can select the task with the most significant intra-queue priority for performance. As another example, the intra-queue priority can be one factor of several considered by the modular electronic device when selecting tasks for performance.

At 1210, the modular electronic device causes performance of the selected first task. For example, the modular electronic device can negotiate with one or more modules/devices to obtain use of the required resources so that the first task can be performed.

Figure 13:
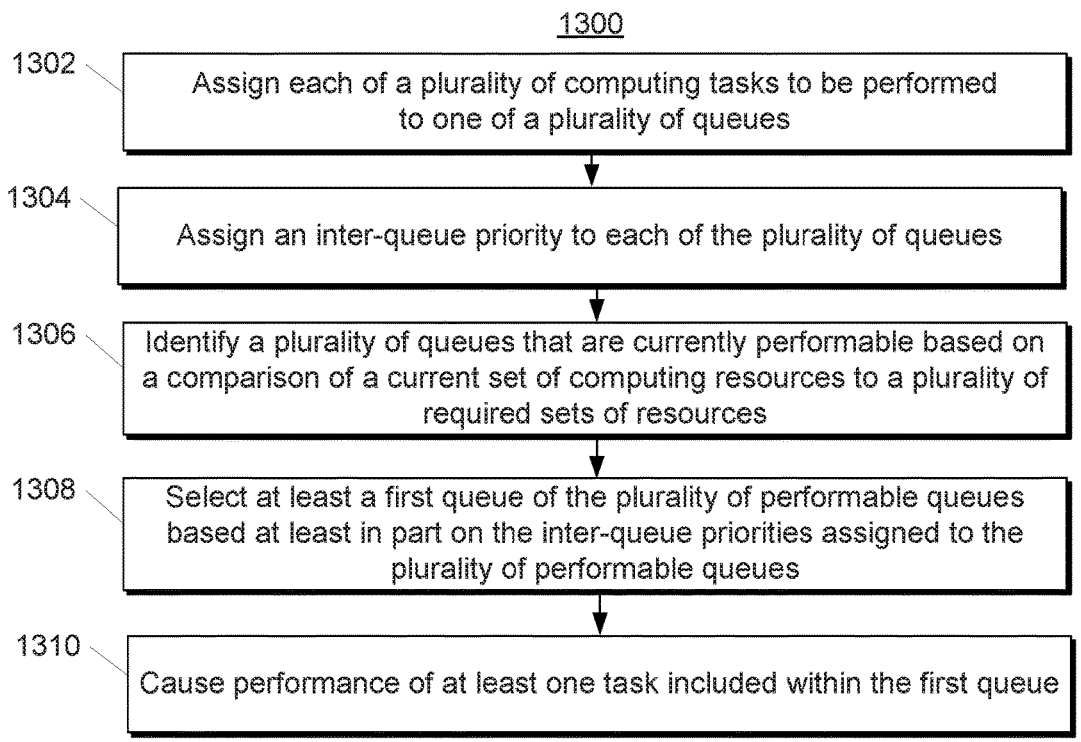
FIG. 13 depicts a flow chart diagram of an example method for queue selection based on inter-queue priority according to example embodiments of the present disclosure.

FIG. 13 depicts a flow chart diagram of an example method 1300 for queue selection based on inter-queue priority according to example embodiments of the present disclosure. Although method 1300 will be discussed with reference to an example modular electronic device, example method 1300 can be performed by a non-modular device instead.

At 1302, the modular electronic device assigns each of a plurality of computing tasks to be performed to one of a plurality of queues. For example, the modular electronic device (e.g., one of the device's modules) can create and manage task queues which are associated with certain set(s) of devices/functionalities.

At 1304, the modular electronic device assigns an inter-queue priority to each of the plurality of queues. For example, the inter-queue priority for each queue can generally describe an importance of having such queue performed relative to other queues.

In some implementations, the inter-queue priority for a particular queue can be based on the global priorities associated with the tasks included within such queue. As one example, the inter-queue priority for a particular queue can be equal to or otherwise based on a cumulative or aggregate priority associated with all of the tasks included within such queue. As another example, the inter-queue priority for a particular queue can equal or otherwise be based on the most significant global priority assigned to one of the tasks included within such queue. In other implementations, the inter-queue priority is independent from or otherwise uninfluenced by the global priorities associated with tasks included within such queue.

At 1306, the modular electronic device identifies a plurality of queues that are currently performable based on a comparison of a current set of computing resources to a plurality of required sets of resources respectively associated with the plurality of queues.

At 1308, the modular electronic device selects at least a first queue of the plurality of performable queues based at least in part on the inter-queue priorities assigned to the plurality of performable queues. For example, a first queue that includes one or more performable tasks can be selected for performance in favor of a second queue if the first queue has a superior inter-queue priority.

At 1310, the modular electronic device causes performance of at least one task included within the first queue. For example, the modular electronic device can negotiate with one or more modules/devices to obtain use of the required resources so that the task(s) within the first queue can be performed.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 8-13 respectively depict steps performed in a particular order for purposes of illustration and discussion, the methods of the present disclosure are not limited to the particularly illustrated order or arrangement. The various steps of the methods 800-1300 can be omitted, rearranged, combined, and/or adapted in various ways without deviating from the scope of the present disclosure.

What is claimed is:

1. A computer-implemented method for contextual task management, the method comprising:
   identifying, by an electronic device, a plurality of computing tasks to be performed, wherein the electronic device is physically movable between a plurality of different locations by a user of the electronic device, and wherein a plurality of different and dynamically-changing ad hoc combinations of devices are respectively available at the plurality of different locations;
   determining, by the electronic device, a plurality of required sets of computing resources respectively required to perform the plurality of computing tasks; and
   for each of two or more locations of the plurality of different locations and while the electronic device is respectively present at each of the two or more locations:
      determining, by the electronic device, a current set of computing resources that are currently available to the electronic device at such location via the respective dynamically-changing ad hoc combination of devices available at such location;
      comparing, by the electronic device, the current set of computing resources to the plurality of required sets of computing resources;
      identifying, by the electronic device, at least one computing task that is currently performable based on the comparison of the current set of computing resources to the plurality of required sets of computing resources; and
      causing, by the electronic device, performance of the at least one performable computing task by the respective dynamically-changing ad hoc combination of devices available at such location.

2. The computer-implemented method of claim 1, further comprising:
   providing, by the electronic device, a notification to a user of the electronic device that identifies the at least one performable computing task; and
   receiving, by the electronic device, data descriptive of a user input that instructs performance of the at least one performable computing task;
   wherein causing, by the electronic device, performance of the at least one performable computing task by the ad hoc combination of devices comprises causing, by the electronic device, performance of the at least one performable computing task by the ad hoc combination of devices in response to the user input that instructs performance of the at least one performable computing task.

3. The computer-implemented method of claim 1, wherein:
   identifying, by the electronic device, the at least one performable computing task comprises identifying, by the electronic device, a plurality of performable computing tasks based on the comparison of the current set of computing resources to the plurality of required sets of computing resources;
   the method further comprises:
      providing, by the electronic device, a notification to a user of the electronic device that identifies the plurality of performable computing tasks; and
      receiving, by the electronic device, data descriptive of a user input that selects a first performable task of the plurality of performable computing tasks and that instructs performance of the first performable task; and
      causing, by the electronic device, performance of the at least one performable computing task comprises causing, by the electronic device, performance of the first performable task by the ad hoc combination of devices in response to the user input that instructs performance of the first performable task.

4. The computer-implemented method of claim 1, wherein:
   identifying, by the electronic device, the plurality of computing tasks to be performed comprises predicting, by the electronic device, a first computing task that a user of the electronic device will request to be performed in at least one future time period; and
   identifying, by the electronic device, at least one computing task that is currently performable comprises determining, by the electronic device, that the predicted first computing task is currently performable.

5. The computer-implemented method of claim 1, wherein:

identifying, by the electronic device, the at least one performable computing task comprises identifying, by the electronic device, a plurality of performable computing tasks based on the comparison of the current set of computing resources to the plurality of required sets of computing resources; and the method further comprises:

assigning, by the electronic device, a priority to each of the plurality of computing tasks; and after identifying, by the electronic device, the plurality of performable computing tasks, selecting, by the electronic device, at least one of the plurality of performable computing tasks for performance based at least in part on the respective priority assigned to each of the plurality of performable computing tasks.

6. The computer-implemented method of claim 1, further comprising:

assigning, by the electronic device, the plurality of computing tasks into a plurality of queues, the plurality of queues respectively associated with the plurality of required sets of computing resources;

wherein identifying, by the electronic device, at least one performable computing task comprises identifying, by the electronic device, at least one performable queue based on the comparison of the current set of computing resources to the plurality of required sets of computing resources; and wherein causing, by the electronic device, performance of the at least one performable computing task comprises causing, by the electronic device, performance of at least one of the computing tasks assigned to the at least one performable queue.

7. The computer-implemented method of claim 6, further comprising:

assigning, by the electronic device, an intra-queue priority to each of the plurality of computing tasks; and after identifying, by the electronic device, the at least one performable queue, selecting, by the electronic device, the at least one of the computing tasks assigned to the at least one performable queue for performance based at least in part on the respective intra-queue priority assigned to each of the computing tasks assigned to the at least one performable queue.

8. The computer-implemented method of claim 6, further comprising:

assigning, by the electronic device, an inter-queue priority to each of the plurality of queues;

wherein identifying, by the electronic device, at least one performable queue based on the comparison of the current set of computing resources to the plurality of required sets of computing resources comprises:

identifying, by the electronic device, a plurality of performable queues based on the comparison of the current set of computing resources to the plurality of required sets of computing resources; and selecting, by the electronic device, at least a first performable queue of the plurality of performable queues for performance based at least in part on the inter-queue priorities respectively assigned to the plurality of performable queues; and wherein causing, by the electronic device, performance of at least one of the computing tasks assigned to the at least one performable queue comprises causing, by the electronic device, performance of at least one of the computing tasks assigned to the selected first performable queue.

9. The computer-implemented method of claim 1, wherein:

the respective dynamically-changing ad hoc combination of devices available at each of the two or more of the plurality of different locations comprises an additional computing device that is communicatively coupled to the electronic device but not physically coupled to the electronic device; and the at least one performable computing task is performed at least in part by the additional computing device.

10. An electronic device, comprising:

at least one processor;

wherein the electronic device is physically movable between a plurality of different locations by a user of the electronic device;

wherein a plurality of different and dynamically-changing ad hoc combinations of devices are respectively available at the plurality of different locations; and wherein the electronic device is configured to:

identify a plurality of computing tasks to be performed;

determine a plurality of required sets of computing resources respectively required to perform the plurality of computing tasks; and for each of two or more locations of the plurality of different locations and while the electronic device is respectively present at each of the two or more locations:

sense a current set of computing resources that are currently available to the electronic device at such location via the respective dynamically-changing ad hoc combination of devices available at such location;

compare the current set of computing resources to the plurality of required sets of computing resources;

identify at least one computing task that is currently performable based on the comparison of the current set of computing resources to the plurality of required sets of computing resources; and cause performance of the at least one performable computing task by the respective dynamically-changing ad hoc combination of devices available at such location.

11. The electronic device of claim 10, wherein the electronic device is configured to:

provide a notification to a user of the electronic device that identifies the at least one performable computing task;

receive data descriptive of a user input that instructs performance of the at least one performable computing task; and cause performance of the at least one performable computing task by the ad hoc combination of devices in response to the user input that instructs performance of the at least one performable computing task.

12. The electronic device of claim 10, wherein the electronic device is configured to:

identify a plurality of performable computing tasks based on the comparison of the current set of computing resources to the plurality of required sets of computing resources;

provide a notification to a user of the electronic device that identifies the plurality of performable computing tasks;

receive data descriptive of a user input that instructs performance of a first performable task of the plurality of performable computing tasks; and cause performance of the first performable task by the ad hoc combination of devices in response to the user input that instructs performance of the first performable task.

13. The electronic device of claim 10, wherein:
to identify the plurality of computing tasks to be performed, the electronic device is configured to predict a first computing task that a user of the electronic device will request to be performed in at least one future time period; and
to identify the at least one computing task that is currently performable, the electronic device is configured to determine that the predicted first computing task is currently performable in advance of the at least one future time period.

14. The electronic device of claim 10, wherein the electronic device is configured to:
assign a priority to each of the plurality of computing tasks;
identify a plurality of performable computing tasks based on the comparison of the current set of computing resources to the plurality of required sets of computing resources; and
after identifying the plurality of performable computing tasks, select at least one of the plurality of performable computing tasks for performance based at least in part on the respective priority assigned to each of the plurality of performable computing tasks.

15. The electronic device of claim 10, wherein:
the electronic device is configured to assign the plurality of computing tasks into a plurality of queues, the plurality of queues respectively associated with the plurality of required sets of computing resources;
to identify the at least one performable computing task, the electronic device is configured to identify at least one performable queue based on the comparison of the current set of computing resources to the plurality of required sets of computing resources; and
to cause performance of the at least one performable computing task, the electronic device is configured to cause performance of at least one of the computing tasks assigned to the at least one performable queue.

16. The electronic device of claim 15, wherein the electronic device is configured to:
assign an intra-queue priority to each of the plurality of computing tasks; and
after identifying the at least one performable queue, select the at least one of the computing tasks assigned to the at least one performable queue for performance based at least in part on the respective intra-queue priority assigned to each of the computing tasks assigned to the at least one performable queue.

17. The electronic device of claim 5, wherein:
the electronic device is configured to assign an inter-queue priority to each of the plurality of queues;
to identify the at least one performable queue, the electronic device is configured to:
identify a plurality of performable queues based on the comparison of the current set of computing resources to the plurality of required sets of computing resources; and
select at least a first performable queue of the plurality of performable queues for performance based at least in part on the inter-queue priorities respectively assigned to the plurality of performable queues; and
to cause performance of the at least one of the computing tasks assigned to the at least one performable queue, the electronic device is configured to cause performance of at least one of the computing tasks assigned to the selected first performable queue.

* * * * *